(12) United States Patent
Schooler et al.

(10) Patent No.: US 11,646,886 B2
(45) Date of Patent: May 9, 2023

(54) DATA OFFLOAD AND TIME SYNCHRONIZATION FOR UBIQUITOUS VISUAL COMPUTING WITNESS

(71) Applicant: Intel Corporation, Santa Clara, CA (US)

(72) Inventors: Eve M. Schooler, Portola Valley, CA (US); Hassnaa Moustafa, Portland, OR (US); Maruti Gupta Hyde, Portland, OR (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 824 days.

(21) Appl. No.: 16/456,410

(22) Filed: Jun. 28, 2019

(65) Prior Publication Data

US 2019/0319793 A1 Oct. 17, 2019

(51) Int. Cl.
| | |
|---|---|
| *H04L 9/32* | (2006.01) |
| *H04W 4/44* | (2018.01) |
| *H04L 67/12* | (2022.01) |
| *H04W 8/00* | (2009.01) |
| *H04W 56/00* | (2009.01) |
| *H04W 12/06* | (2021.01) |
| *H04W 4/38* | (2018.01) |
| *H04L 67/14* | (2022.01) |
| *H04L 9/40* | (2022.01) |
| *H04L 67/1097* | (2022.01) |
| *H04L 67/51* | (2022.01) |

(52) U.S. Cl.
CPC ............ *H04L 9/32* (2013.01); *H04L 63/0838* (2013.01); *H04L 67/1097* (2013.01); *H04L 67/12* (2013.01); *H04L 67/14* (2013.01); *H04L 67/51* (2022.05); *H04W 4/38* (2018.02); *H04W 4/44* (2018.02); *H04W 8/005* (2013.01); *H04W 12/06* (2013.01); *H04W 56/001* (2013.01)

(58) Field of Classification Search
CPC .......... H04W 4/38; H04W 4/40; H04W 4/44; H04W 4/42
See application file for complete search history.

(56) References Cited

U.S. PATENT DOCUMENTS

| | | | |
|---|---|---|---|
| 9,509,394 B1 * | 11/2016 | Mitchell | ................. H04W 4/42 |
| 10,306,430 B1 | 5/2019 | Abari et al. | |
| 11,145,196 B2 * | 10/2021 | Lopez | ................. G08G 1/0129 |

(Continued)

FOREIGN PATENT DOCUMENTS

| | | |
|---|---|---|
| WO | 2018227039 A1 | 12/2018 |
| WO | WO-2019044456 A1 * | 3/2019 |

OTHER PUBLICATIONS

EPO; Extended European Search Report issued in EP Patent Application No. 20164322.8, dated Oct. 8, 2020; 9 pages.

*Primary Examiner* — Esther B. Henderson
(74) *Attorney, Agent, or Firm* — Alliance IP, LLC

(57) ABSTRACT

In one embodiment, a road side unit (RSU) establishes a data offload session with a vehicle in the vicinity of the RSU based on a session establishment request sent by the vehicle, and stores data received from the vehicle during the data offload session in its memory. The RSU generates storage record information (including identifying information for the RSU) for the stored data, and transmits the storage record information to the vehicle.

20 Claims, 18 Drawing Sheets

(56) References Cited

U.S. PATENT DOCUMENTS

| | | | |
|---|---|---|---|
| 2015/0145695 A1* | 5/2015 | Hyde | G08G 1/166 |
| | | | 340/905 |
| 2015/0170429 A1* | 6/2015 | Denny | G07C 5/008 |
| | | | 701/1 |
| 2017/0366616 A1 | 12/2017 | Nascimento et al. | |
| 2018/0199237 A1* | 7/2018 | Vare | H04W 28/08 |
| 2019/0044703 A1 | 2/2019 | Smith | |
| 2019/0132709 A1 | 5/2019 | Graefe et al. | |
| 2021/0136572 A1* | 5/2021 | Ingraham | H04W 4/40 |

* cited by examiner

DATA OFFLOAD AND TIME SYNCHRONIZATION FOR UBIQUITOUS VISUAL COMPUTING WITNESS

FIELD OF THE SPECIFICATION

This disclosure relates in general to the field of visual computing, and more particularly, though not exclusively, to a ubiquitous visual computing witness.

BACKGROUND

The process of gathering facts, evidence, and/or information often involves numerous sources, such as eye witnesses, physical environments, electronic environments (e.g., surveillance systems), and so forth. Existing approaches for gathering facts and evidence, however, suffer from various shortcomings. In many cases, for example, it can be challenging or impossible to even identify the respective sources of relevant data. Further, because existing approaches are not automated, they typically require information to be manually collected from each individual source. Moreover, the respective sources are often under the ownership and/or control of multiple different entities, which further complicates the information gathering process. Finally, while advancements in technology have led to widespread penetration of numerous types of electronic devices that could potentially be leveraged for information gathering purposes (e.g., cameras, sensors, mobile devices), there is no efficient mechanism for identifying electronic devices with relevant information and collecting information from those devices.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
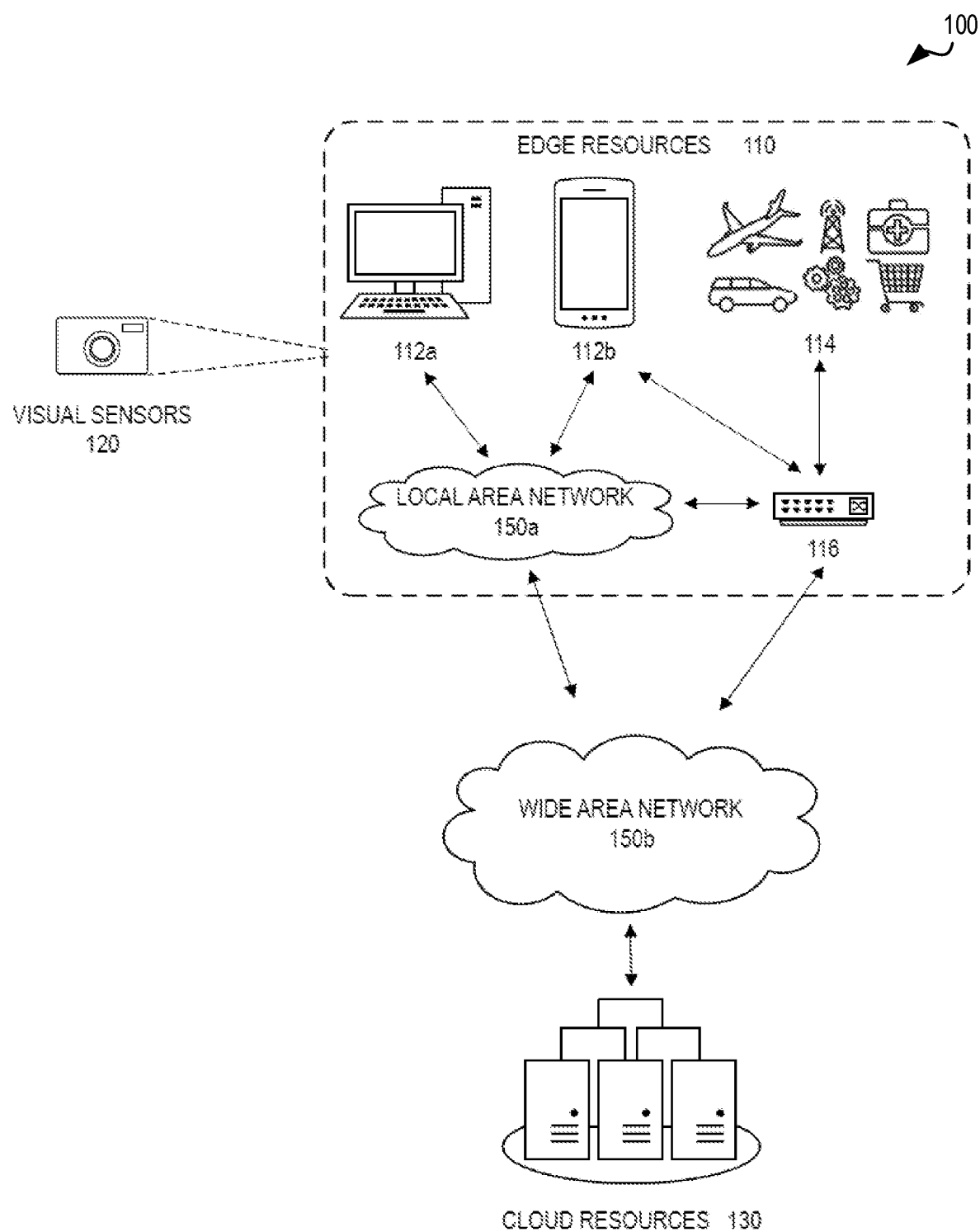
FIG. 1 illustrates an example embodiment of a visual fog system in accordance with certain embodiments.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Example embodiments that may be used to implement the features and functionality of this disclosure will now be described with more particular reference to the attached FIGURES.

Visual Fog Introduction

FIG. 1 illustrates an example embodiment of a visual fog system 100 in accordance with certain embodiments. Advancements in modern computing have led to an increased use of computer vision technologies and large-scale visual computing for a variety of mainstream computing applications. In particular, rapid deployments of cameras and other types of computer vision technologies have been leveraged for a variety of visual computing applications that rely on large-scale video analytics and visual data processing. For example, large-scale visual computing can be leveraged for security and surveillance, transportation (e.g., traffic monitoring, navigation, parking, infrastructure planning, security or amber alerts), retail (e.g., customer analytics), enterprise applications, and so forth.

Existing approaches to large-scale visual computing, however, suffer from numerous limitations. In particular, existing visual computing approaches are implemented using rigid designs that utilize resources inefficiently (e.g., processing, bandwidth, and storage resources) and provide limited functionality. For example, using existing approaches, visual data is typically captured by devices at the edge of a network and simply funneled to the cloud for processing and storage, thus relying heavily on the cloud infrastructure. Due to the large size of visual data, however, this approach typically consumes significant network bandwidth and requires substantial processing and storage resources in the cloud. As a result, existing approaches often suffer from high latency and inefficient resource utilization, and may also be inaccurate, unreliable, inflexible, and incapable of scaling efficiently.

Accordingly, this disclosure describes various embodiments of a visual fog computing system 100 for performing large-scale visual computing in an efficient and reliable manner. For example, rather than relying exclusively or primarily on cloud resources 130 for visual computing tasks, visual fog system 100 leverages both cloud 130 and edge 110 resources, which may be collectively referred to as the "fog." In this manner, visual fog system 100 can leverage all available "fog" resources to perform visual computing tasks more efficiently, thus improving resource utilization, latency, accuracy, precision, and reliability. Moreover, as described further throughout this disclosure, visual fog system 100 can be implemented using a flexible design that supports ad-hoc queries and is highly scalable, thus rendering it suitable for many visual computing applications and use cases.

In the illustrated embodiment of FIG. 1, visual fog system 100 includes edge resources 110 and a plurality of associated visual sensors 120, cloud resources 130, and communication networks 150, which are respectively discussed further below. Moreover, in various embodiments, these components of visual fog system 100 may be implemented some or all aspects of the visual computing functionality described throughout this disclosure in connection with the remaining FIGURES.

Edge resources 110 may include any equipment, devices, and/or components deployed or connected near the "edge" of a communication network. In the illustrated embodiment, for example, edge resources 110 include end-user devices 112a,b (e.g., desktops, laptops, mobile devices), Internet-of-Things (IoT) devices 114, and gateways or routers 116, as described further below. Edge resources 110 may communicate with each other and/or with other remote networks and resources (e.g., cloud resources 130) through one or more communication networks 150, such as local area network 150a and/or wide area network 150b. Moreover, in the illustrated embodiment, edge resources 110 collectively include a plurality of visual sensors 120 (e.g., cameras) for capturing visual representations and data associated with their surroundings. In some embodiments, for example, certain end-user devices 112 and/or IoT devices 114 may include one or more cameras and/or other types of visual sensors 120. Visual sensors 120 may include any type of visual or optical sensors, such as cameras, ultraviolet (UV) sensors, laser rangefinders (e.g., light detection and ranging (LIDAR)), infrared (IR) sensors, electro-optical/infrared (EO/IR) sensors, and so forth.

End-user devices 112 may include any device that enables or facilitates interaction with a user in visual fog system 100, including, for example, desktop computers, laptops, tablets, mobile phones and other mobile devices, and wearable devices (e.g., smart watches, smart glasses, headsets), among other examples.

IoT devices 114 may include any device capable of communicating and/or participating in an Internet-of-Things (IoT) system or network. IoT systems may refer to new or improved ad-hoc systems and networks composed of a variety of different devices (e.g., IoT devices 114) interoperating and synergizing for a particular application or use case. Such ad-hoc systems are emerging as more and more products and equipment evolve to become "smart," meaning they are controlled or monitored by computer processors and are capable of communicating with other devices. For example, an IoT device 114 may include a computer processor and/or communication interface to allow interoperation with other components of visual fog system 100, such as with cloud resources 130 and/or other edge resources 110.

IoT devices 114 may be "greenfield" devices that are developed with IoT capabilities from the ground-up, or "brownfield" devices that are created by integrating IoT capabilities into existing legacy devices that were initially developed without IoT capabilities. For example, in some cases, IoT devices 114 may be built from sensors and communication modules integrated in or attached to "things," such as equipment, toys, tools, vehicles, living things (e.g., plants, animals, humans), and so forth. Alternatively, or additionally, certain IoT devices 114 may rely on intermediary components, such as edge gateways or routers 116, to communicate with the various components of system 100.

IoT devices 114 may include various types of sensors for monitoring, detecting, measuring, and generating sensor data and signals associated with characteristics of their environment. In some embodiments, for example, certain IoT devices 114 may include visual sensors 120 (e.g., cameras) for capturing visual representations and data associated with their surroundings. IoT devices 114 may also include other types of sensors configured to detect characteristics such as movement, weight, physical contact, temperature, wind, noise, light, position, humidity, radiation, liquid, specific chemical compounds, battery life, wireless signals, computer communications, and bandwidth, among other examples. Sensors can include physical sensors (e.g., physical monitoring components) and virtual sensors (e.g., software-based monitoring components). IoT devices 114 may also include actuators to perform various actions in their respective environments. For example, an actuator may be used to selectively activate certain functionality, such as toggling the power or operation of a security system (e.g., alarm, camera, locks) or household appliance (e.g., audio system, lighting, HVAC appliances, garage doors), among other examples.

Indeed, this disclosure contemplates use of a potentially limitless universe of IoT devices 114 and associated sensors/actuators. IoT devices 114 may include, for example, any type of equipment and/or devices associated with any type of system 100 and/or industry, including transportation (e.g., automobile, airlines), industrial manufacturing, energy (e.g., power plants), telecommunications (e.g., Internet, cellular, and television service providers), retail, medical (e.g., healthcare, pharmaceutical), and/or food and beverage, among others. In the transportation industry, for example, IoT devices 114 may include equipment and devices associated with aircrafts, automobiles, or vessels, such as navigation systems, autonomous flight or driving systems, traffic monitoring and/or planning systems, parking systems, and/or any internal mechanical or electrical components that are monitored by sensors (e.g., engines). IoT devices 114 may also include equipment, devices, and/or infrastructure associated with industrial manufacturing and production, shipping (e.g., cargo tracking), communications networks (e.g., gateways, routers, servers, cellular towers), server farms, electrical power plants, wind farms, oil and gas pipelines, water treatment and distribution, wastewater collection and treatment, and weather monitoring (e.g., temperature, wind, and humidity sensors), among other examples. IoT devices 114 may also include, for example, any type of "smart" device or system, such as smart entertainment systems (e.g., televisions, audio systems, videogame systems), smart household or office appliances (e.g., heat-ventilation-air-conditioning (HVAC) appliances, refrigerators, washers and dryers, coffee brewers), power control systems (e.g., automatic electricity, light, and HVAC controls), security systems (e.g., alarms, locks, cameras, motion detectors, fingerprint scanners, facial recognition systems), and other home automation systems, among other examples. IoT devices 114 can be statically located, such as mounted on a building, wall, floor, ground, lamppost, sign, water tower, or any other fixed or static structure. IoT devices 114 can also be mobile, such as devices in vehicles or aircrafts, drones, packages (e.g., for tracking cargo), mobile devices, and wearable devices, among other examples. Moreover, any type of edge resource 110 may also be considered as an IoT device 114, including end-user devices 112 and edge gateways 116, among other examples.

Edge gateways and/or routers 116 may be used to facilitate communication to and from edge resources 110. For example, gateways 116 may provide communication capabilities to existing legacy devices that were initially developed without any such capabilities (e.g., "brownfield" IoT devices 114). Gateways 116 can also be utilized to extend the geographical reach of edge resources 110 with short-range, proprietary, or otherwise limited communication capabilities, such as IoT devices 114 with Bluetooth or ZigBee communication capabilities. For example, gateways 116 can serve as intermediaries between IoT devices 114 and remote networks or services, by providing a front-haul to the IoT devices 114 using their native communication capabilities (e.g., Bluetooth, ZigBee), and providing a back-haul to other networks 150 and/or cloud resources 130 using another wired or wireless communication medium (e.g., Ethernet, Wi-Fi, cellular). In some embodiments, a gateway 116 may be implemented by a dedicated gateway device, or by a general-purpose device, such as another IoT device 114, end-user device 112, or other type of edge resource 110. In some instances, gateways 116 may also implement certain network management and/or application functionality (e.g., visual computing functionality, IoT application and management functionality), either separately or in conjunction with other components, such as cloud resources 130 and/or other edge resources 110.

Cloud resources 130 may include any resources or services that are hosted remotely over a network, which may otherwise be referred to as in the "cloud." In some embodiments, for example, cloud resources 130 may be remotely hosted on servers in a datacenter (e.g., application servers, database servers). Cloud resources 130 may include any resources, services, and/or functionality that can be utilized by or for edge resources 110, including but not limited to, visual computing applications and services, IoT application and management services, data storage, computational services (e.g., data analytics, searching, diagnostics and fault management), security services (e.g., surveillance, alarms, user authentication), mapping and navigation, geolocation services, network or infrastructure management, payment processing, audio and video streaming, messaging, social networking, news, and weather, among other examples.

Communication networks 150*a,b* may be used to facilitate communication between components of system 100. In the illustrated embodiment, for example, edge resources 110 are connected to local area network (LAN) 150*a* in order to facilitate communication with each other and/or other remote networks or resources, such as wide area network (WAN) 150*b* and/or cloud resources 130. In various embodiments, visual fog system 100 may be implemented using any number or type of communication network(s) 150, including local area networks, wide area networks, public networks, the Internet, cellular networks, Wi-Fi networks, short-range networks (e.g., Bluetooth or ZigBee), and/or any other wired or wireless communication networks or mediums.

In general, edge resources 110 (and in particular IoT devices 114) may generate an extremely large volume and variety of data. As one example, edge resources 110 with visual sensors 120 may generate large volumes of visual data, such as video and/or images. Edge resources 110 typically offload this data to the cloud 130 for processing and/or storage. Cloud resources 130, however, may not necessarily be suited to handle the rapidly growing volume, variety, and velocity of data generated by IoT devices 114 and other edge resources 110. For example, cloud-based processing may not be ideal in certain circumstances, such as processing time-sensitive or highly confidential data, or when faced with network bandwidth constraints, among other examples. Accordingly, in some embodiments, visual fog system 100 may leverage "edge" processing to augment the performance and capabilities of the cloud 130 using edge resources 110. Edge processing is an approach that involves processing certain data at the network edge (e.g., using edge resources 110), near where the data is generated, rather than simply funneling large volumes of data to the cloud for processing and storage. Certain data may still be sent to the cloud, as appropriate, such as for deeper analysis and/or long-term storage. Edge processing may be used to complement the shortcomings of cloud-based processing (e.g., when cloud-based processing is inefficient, ineffective, and/or unsecure), and thus improve the handling of the growing volume, variety, and velocity of data generated by IoT devices 114 and/or other edge resources 110. For example, in some cases, processing data near its source (e.g., in the network edge) rather than in the cloud may improve performance and/or avoid system failures or disasters. Edge processing may also conserve network bandwidth, which may be particularly beneficial when facing bandwidth constraints and/or limited network connectivity.

In some cases, the collective use of both edge 110 and cloud 130 resources may be referred to as "fog" computing, as functionality of the "cloud" 130 is effectively extended by the edge resources 110, thus forming a "fog" over the network edge. Moreover, in some embodiments, devices 110 in the "fog" may connect and/or communicate with each other using an interconnection standard or protocol, such as the open interconnect consortium (OIC) standard specification 1.0, released by the Open Connectivity Foundation™ (OCF) on Dec. 23, 2015, which enables devices to discover and connect with each other; Thread, a networking protocol for Internet-of-Things (IoT) devices used in "smart" home automation and similar deployments, developed by an alliance of organizations named the "Thread Group"; the optimized link state routing (OLSR) protocol; and/or the better approach to mobile ad-hoc networking (B.A.T.M.A.N.), among other examples.

Moreover, in some embodiments, fog computing may be leveraged by visual fog system 100 for large-scale visual computing applications. For example, in some embodiments, the components of visual fog system 100 (e.g., edge resources 110, cloud resources 130) may be implemented with some or all aspects of the visual computing functionality described throughout this disclosure in connection with the remaining FIGURES.

Any, all, or some of the computing devices of system 100 may be adapted to execute any operating system, including Linux or other UNIX-based operating systems, Microsoft Windows, Windows Server, MacOS, Apple iOS, Google Android, or any customized and/or proprietary operating system, along with virtual machines adapted to virtualize execution of a particular operating system.

While FIG. 1 is described as containing or being associated with a plurality of elements, not all elements illustrated within system 100 of FIG. 1 may be utilized in each alternative implementation of the present disclosure. Additionally, one or more of the elements described in connection with the examples of FIG. 1 may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Additional embodiments associated with the implementation of a visual fog computing system 100 are described further in connection with the remaining FIGURES. Accordingly, it should be appreciated that visual fog system 100 of FIG. 1 may be implemented with any aspects of the embodiments described throughout this disclosure.

Example Internet-of-Things (IoT) Implementations

FIGS. 2-5 illustrate examples of Internet-of-Things (IoT) networks and devices that can be used in accordance with embodiments disclosed herein. For example, the operations and functionality described throughout this disclosure may be embodied by an IoT device or machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 2:
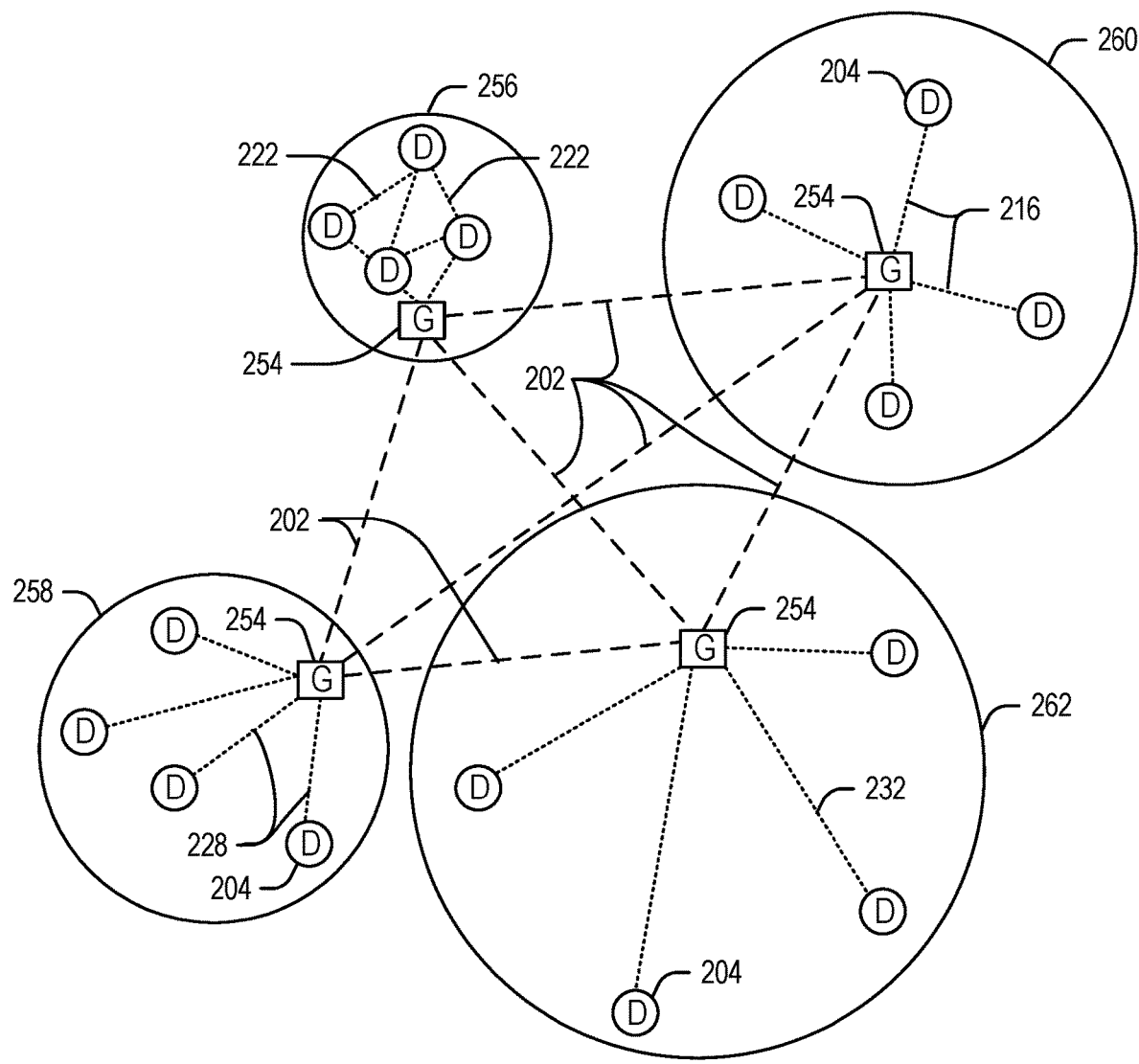
FIGS. 2-5 illustrate examples of Internet-of-Things (IoT) networks and architectures that can be used in accordance with certain embodiments.

FIG. 2 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 2-5, present a number of new challenges in a heterogeneous network of connectivity comprising a combination of wired and wireless technologies.

FIG. 2 specifically provides a simplified drawing of a domain topology that may be used for a number of internet-of-things (IoT) networks comprising IoT devices 204, with the IoT networks 256, 258, 260, 262, coupled through backbone links 202 to respective gateways 254. For example, a number of IoT devices 204 may communicate with a gateway 254, and with each other through the gateway 254. To simplify the drawing, not every IoT device 204, or communications link (e.g., link 216, 222, 228, or 232) is labeled. The backbone links 202 may include any number of wired or wireless technologies, including optical networks, and may be part of a local area network (LAN), a wide area network (WAN), or the Internet. Additionally, such communication links facilitate optical signal paths among both IoT devices 204 and gateways 254, including the use of MUXing/deMUXing components that facilitate interconnection of the various devices.

The network topology may include any number of types of IoT networks, such as a mesh network provided with the network 256 using Bluetooth low energy (BLE) links 222. Other types of IoT networks that may be present include a wireless local area network (WLAN) network 258 used to communicate with IoT devices 204 through IEEE 802.11 (Wi-Fi®) links 228, a cellular network 260 used to communicate with IoT devices 204 through an LTE/LTE-A (4G) or 5G cellular network, and a low-power wide area (LPWA) network 262, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 204, such as over the backbone links 202, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 256, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 258, for instance, may use systems that perform standards conversion to provide multi-standard connectivity, enabling IoT devices 204 using different protocols to communicate. Further systems may provide seamless interconnectivity across a multi-standard infrastructure comprising visible Internet resources and hidden Internet resources.

Communications in the cellular network 260, for instance, may be enhanced by systems that offload data, extend communications to more remote devices, or both. The LPWA network 262 may include systems that perform non-Internet protocol (IP) to IP interconnections, addressing, and routing. Further, each of the IoT devices 204 may include the appropriate transceiver for wide area communications with that device. Further, each IoT device 204 may include other transceivers for communications using additional protocols and frequencies.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 3 below.

Figure 3:
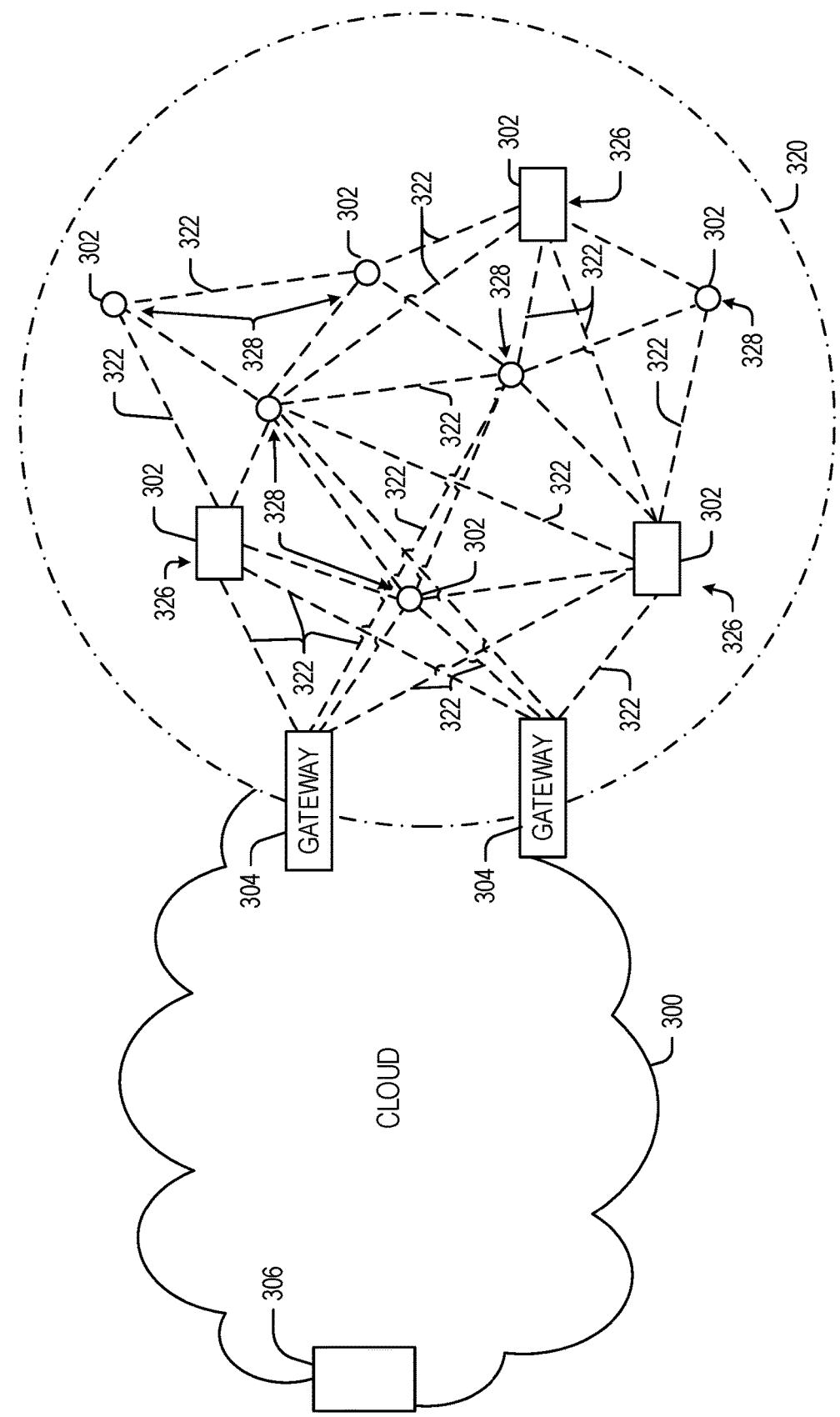

FIG. 3 illustrates a cloud computing network in communication with a mesh network of IoT devices (devices 302) operating as a fog device at the edge of the cloud computing network. The mesh network of IoT devices may be termed a fog 320, operating at the edge of the cloud 300. To simplify the diagram, not every IoT device 302 is labeled.

The fog 320 may be considered to be a massively interconnected network wherein a number of IoT devices 302 are in communications with each other, for example, by radio links 322. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 302 are shown in this example, gateways 304, data aggregators 326, and sensors 328, although any combinations of IoT devices 302 and functionality may be used. The gateways 304 may be edge devices that provide communications between the cloud 300 and the fog 320, and may also provide the backend process function for data obtained from sensors 328, such as motion data, flow data, temperature data, and the like. The data aggregators 326 may collect data from any number of the sensors 328, and perform the back-end processing function for the analysis. The results, raw data, or both may be passed along to the cloud 300 through the gateways 304. The sensors 328 may be full IoT devices 302, for example, capable of both collecting data and processing the data. In some cases, the sensors 328 may be more limited in functionality, for example, collecting the data and allowing the data aggregators 326 or gateways 304 to process the data.

Communications from any IoT device 302 may be passed along a convenient path (e.g., a most convenient path) between any of the IoT devices 302 to reach the gateways 304. In these networks, the number of interconnections provide substantial redundancy, allowing communications to be maintained, even with the loss of a number of IoT devices 302. Further, the use of a mesh network may allow IoT devices 302 that are very low power or located at a distance from infrastructure to be used, as the range to connect to another IoT device 302 may be much less than the range to connect to the gateways 304.

The fog 320 provided from these IoT devices 302 may be presented to devices in the cloud 300, such as a server 306, as a single device located at the edge of the cloud 300, e.g., a fog device. In this example, the alerts coming from the fog device may be sent without being identified as coming from a specific IoT device 302 within the fog 320. In this fashion, the fog 320 may be considered a distributed platform that provides computing and storage resources to perform processing or data-intensive tasks such as data analytics, data aggregation, and machine-learning, among others.

In some examples, the IoT devices 302 may be configured using an imperative programming style, e.g., with each IoT device 302 having a specific function and communication partners. However, the IoT devices 302 forming the fog device may be configured in a declarative programming style, allowing the IoT devices 302 to reconfigure their operations and communications, such as to determine needed resources in response to conditions, queries, and device failures. As an example, a query from a user located at a server 306 about the operations of a subset of equipment monitored by the IoT devices 302 may result in the fog 320 device selecting the IoT devices 302, such as particular sensors 328, needed to answer the query. The data from these sensors 328 may then be aggregated and analyzed by any combination of the sensors 328, data aggregators 326, or gateways 304, before being sent on by the fog 320 device to the server 306 to answer the query. In this example, IoT devices 302 in the fog 320 may select the sensors 328 used based on the query, such as adding data from flow sensors or temperature sensors. Further, if some of the IoT devices 302 are not operational, other IoT devices 302 in the fog 320 device may provide analogous data, if available.

Figure 4:
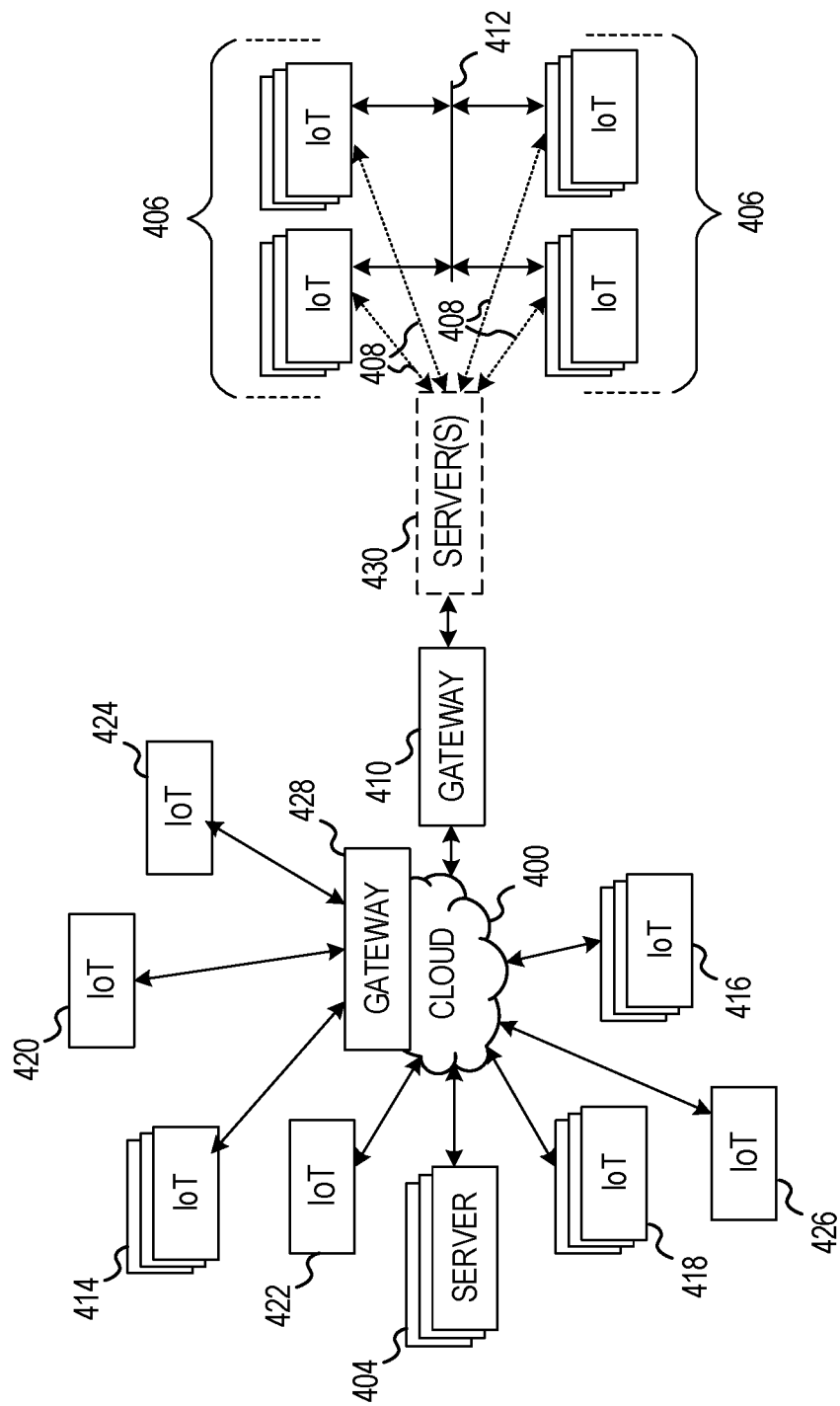

FIG. 4 illustrates a drawing of a cloud computing network, or cloud 400, in communication with a number of Internet of Things (IoT) devices. The cloud 400 may represent the Internet, or may be a local area network (LAN), or a wide area network (WAN), such as a proprietary network for a company. The IoT devices may include any number of different types of devices, grouped in various combinations. For example, a traffic control group 406 may include IoT devices along streets in a city. These IoT devices may include stoplights, traffic flow monitors, cameras, weather sensors, and the like. The traffic control group 406, or other subgroups, may be in communication with the cloud 400 through wired or wireless links 408, such as LPWA links, optical links, and the like. Further, a wired or wireless sub-network 412 may allow the IoT devices to communicate with each other, such as through a local area network, a wireless local area network, and the like. The IoT devices may use another device, such as a gateway 510 or 528 to communicate with remote locations such as the cloud 500; the IoT devices may also use one or more servers 530 to facilitate communication with the cloud 500 or with the gateway 510. For example, the one or more servers 530 may operate as an intermediate network node to support a local edge cloud or fog implementation among a local area network. Further, the gateway 528 that is depicted may operate in a cloud-to-gateway-to-many edge devices configuration, such as with the various IoT devices 514, 520, 524 being constrained or dynamic to an assignment and use of resources in the cloud 500.

Other example groups of IoT devices may include remote weather stations 414, local information terminals 416, alarm systems 418, automated teller machines 420, alarm panels 422, or moving vehicles, such as emergency vehicles 424 or other vehicles 426, among many others. Each of these IoT devices may be in communication with other IoT devices, with servers 404, with another IoT fog device or system (not shown, but depicted in FIG. 3), or a combination therein. The groups of IoT devices may be deployed in various residential, commercial, and industrial settings (including in both private or public environments).

As can be seen from FIG. 4, a large number of IoT devices may be communicating through the cloud 400. This may allow different IoT devices to request or provide information to other devices autonomously. For example, a group of IoT devices (e.g., the traffic control group 406) may request a current weather forecast from a group of remote weather stations 414, which may provide the forecast without human intervention. Further, an emergency vehicle 424 may be alerted by an automated teller machine 420 that a burglary is in progress. As the emergency vehicle 424 proceeds towards the automated teller machine 420, it may access the traffic control group 406 to request clearance to the location, for example, by lights turning red to block cross traffic at an intersection in sufficient time for the emergency vehicle 424 to have unimpeded access to the intersection.

Clusters of IoT devices, such as the remote weather stations 414 or the traffic control group 406, may be equipped to communicate with other IoT devices as well as with the cloud 400. This may allow the IoT devices to form an ad-hoc network between the devices, allowing them to function as a single device, which may be termed a fog device or system (e.g., as described above with reference to FIG. 3).

Figure 5:
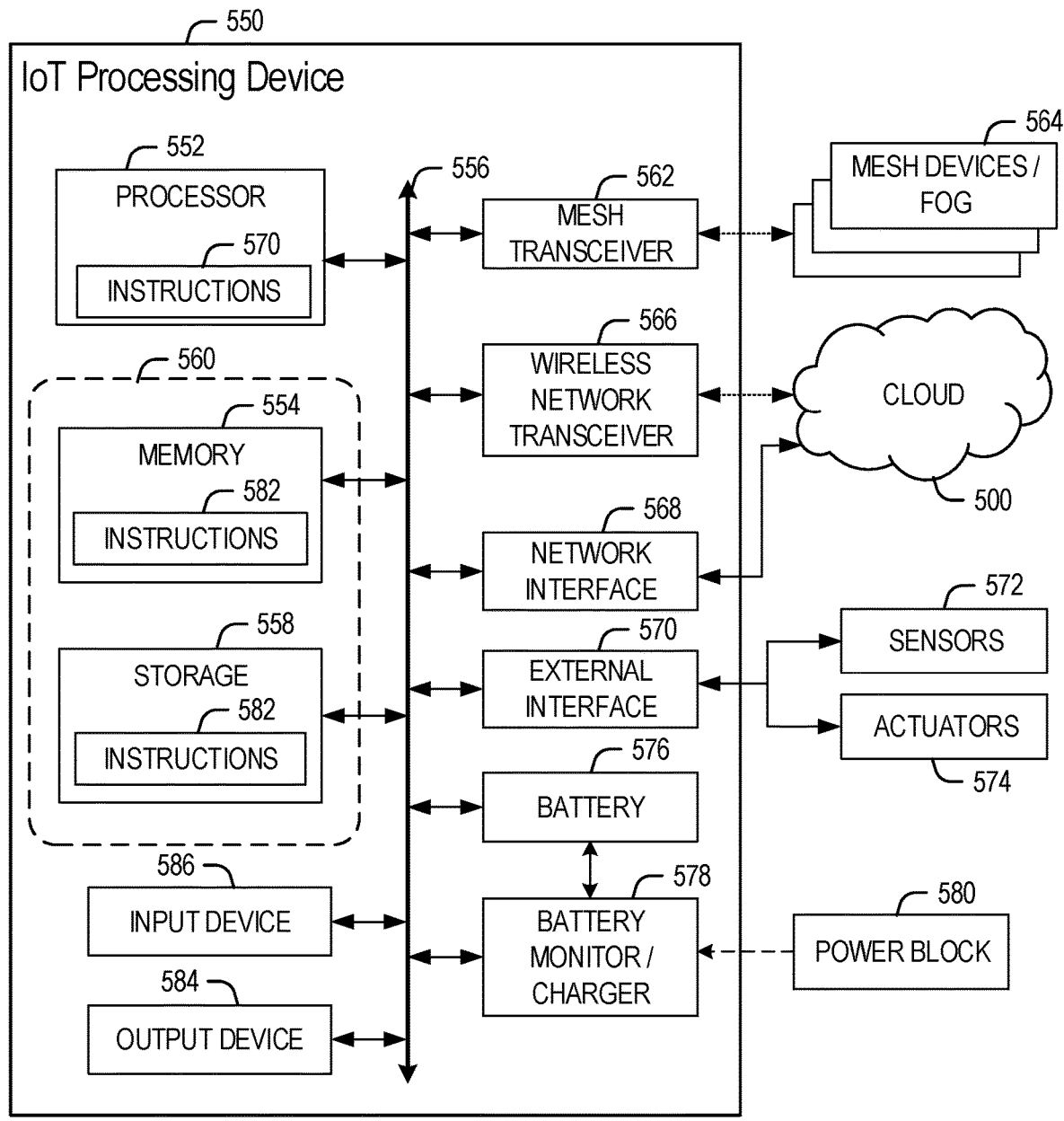

FIG. 5 is a block diagram of an example of components that may be present in an IoT device 550 for implementing the techniques described herein. The IoT device 550 may include any combinations of the components shown in the example or referenced in the disclosure above. The components may be implemented as ICs, portions thereof, discrete electronic devices, or other modules, logic, hardware, software, firmware, or a combination thereof adapted in the IoT device 550, or as components otherwise incorporated within a chassis of a larger system. Additionally, the block diagram of FIG. 5 is intended to depict a high-level view of components of the IoT device 550. However, some of the components shown may be omitted, additional components may be present, and different arrangement of the components shown may occur in other implementations.

The IoT device 550 may include a processor 552, which may be a microprocessor, a multi-core processor, a multi-threaded processor, an ultra-low voltage processor, an embedded processor, or other known processing element. The processor 552 may be a part of a system on a chip (SoC) in which the processor 552 and other components are formed into a single integrated circuit, or a single package, such as the Edison™ or Galileo™ SoC boards from Intel. As an example, the processor 552 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 552 may communicate with a system memory 554 over an interconnect 556 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 558 may also couple to the processor 552 via the interconnect 556. In an example, the storage 558 may be implemented via a solid state disk drive (SSDD). Other devices that may be used for the storage 558 include flash memory cards, such as SD cards, microSD cards, xD picture cards, and the like, and USB flash drives. In low power implementations, the storage 558 may be on-die memory or registers associated with the processor 552. However, in some examples, the storage 558 may be implemented using a micro hard disk drive (HDD). Further, any number of new technologies may be used for the storage 558 in addition to, or instead of, the technologies described, such resistance change memories, phase change memories, holographic memories, or chemical memories, among others.

The components may communicate over the interconnect 556. The interconnect 556 may include any number of technologies, including industry standard architecture (ISA), extended ISA (EISA), peripheral component interconnect (PCI), peripheral component interconnect extended (PCIx), PCI express (PCIe), or any number of other technologies. The interconnect 556 may be a proprietary bus, for example, used in a SoC based system. Other bus systems may be included, such as an I2C interface, an SPI interface, point to point interfaces, and a power bus, among others.

The interconnect 556 may couple the processor 552 to a mesh transceiver 562, for communications with other mesh devices 564. The mesh transceiver 562 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 564. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 562 may communicate using multiple standards or radios for communications at different range. For example, the IoT device 550 may communicate with close devices, e.g., within about 10 meters, using a local transceiver based on BLE, or another low power radio, to save power. More distant mesh devices 564, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 566 may be included to communicate with devices or services in the cloud 500 via local or wide area network protocols. The wireless network transceiver 566 may be a LPWA transceiver that follows the IEEE 802.15.4, or IEEE 802.15.4g standards, among others. The IoT device 550 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 562 and wireless network transceiver 566, as described herein. For example, the radio transceivers 562 and 566 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 562 and 566 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 566, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 568 may be included to provide a wired communication to the cloud 500 or to other devices, such as the mesh devices 564. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 568 may be included to allow connect to a second network, for example, a NIC 568 providing communications to the cloud over Ethernet, and a second NIC 568 providing communications to other devices over another type of network.

The interconnect 556 may couple the processor 552 to an external interface 570 that is used to connect external devices or subsystems. The external devices may include sensors 572, such as accelerometers, level sensors, flow sensors, optical light sensors, camera sensors, temperature sensors, a global positioning system (GPS) sensors, pressure sensors, barometric pressure sensors, and the like. The external interface 570 further may be used to connect the IoT device 550 to actuators 574, such as power switches, valve actuators, an audible sound generator, a visual warning device, and the like.

In some optional examples, various input/output (I/O) devices may be present within, or connected to, the IoT device 550. For example, a display or other output device 584 may be included to show information, such as sensor readings or actuator position. An input device 586, such as a touch screen or keypad may be included to accept input. An output device 584 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 550.

A battery 576 may power the IoT device 550, although in examples in which the IoT device 550 is mounted in a fixed location, it may have a power supply coupled to an electrical grid. The battery 576 may be a lithium ion battery, or a metal-air battery, such as a zinc-air battery, an aluminum-air battery, a lithium-air battery, and the like.

A battery monitor/charger 578 may be included in the IoT device 550 to track the state of charge (SoCh) of the battery 576. The battery monitor/charger 578 may be used to monitor other parameters of the battery 576 to provide failure predictions, such as the state of health (SoH) and the state of function (SoF) of the battery 576. The battery monitor/charger 578 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 578 may communicate the information on the battery 576 to the processor 552 over the interconnect 556. The battery monitor/charger 578 may also include an analog-to-digital (ADC) convertor that allows the processor 552 to directly monitor the voltage of the battery 576 or the current flow from the battery 576. The battery parameters may be used to determine actions that the IoT device 550 may perform, such as transmission frequency, mesh network operation, sensing frequency, and the like.

A power block 580, or other power supply coupled to a grid, may be coupled with the battery monitor/charger 578 to charge the battery 576. In some examples, the power block 580 may be replaced with a wireless power receiver to obtain the power wirelessly, for example, through a loop antenna in the IoT device 550. A wireless battery charging circuit, such as an LTC4020 chip from Linear Technologies of Milpitas, Calif., among others, may be included in the battery monitor/charger 578. The specific charging circuits chosen depend on the size of the battery 576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 558 may include instructions 582 in the form of software, firmware, or hardware commands to implement the techniques described herein. Although such instructions 582 are shown as code blocks included in the memory 554 and the storage 558, it may be understood that any of the code blocks may be replaced with hardwired circuits, for example, built into an application specific integrated circuit (ASIC).

In an example, the instructions 582 provided via the memory 554, the storage 558, or the processor 552 may be embodied as a non-transitory, machine readable medium 560 including code to direct the processor 552 to perform electronic operations in the IoT device 550. The processor 552 may access the non-transitory, machine readable medium 560 over the interconnect 556. For instance, the non-transitory, machine readable medium 560 may include storage units such as optical disks, flash drives, or any number of other hardware devices. The non-transitory, machine readable medium 560 may include instructions to direct the processor 552 to perform a specific sequence or flow of actions, for example, as described with respect to the flowchart(s) and diagram(s) of operations and functionality described throughout this disclosure.

Example Computing Architectures

Figure 6:
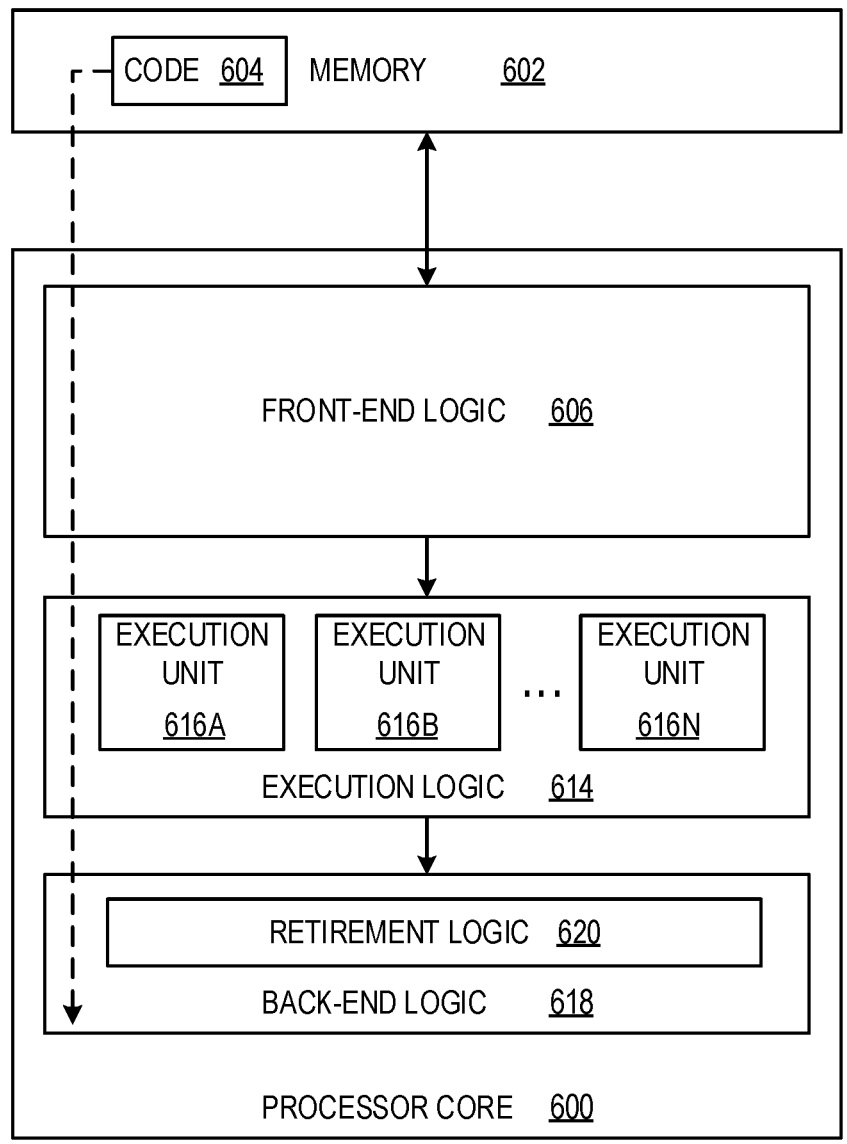
FIGS. 6-7 illustrate example computer architectures that can be used in accordance with certain embodiments.
Figure 7:
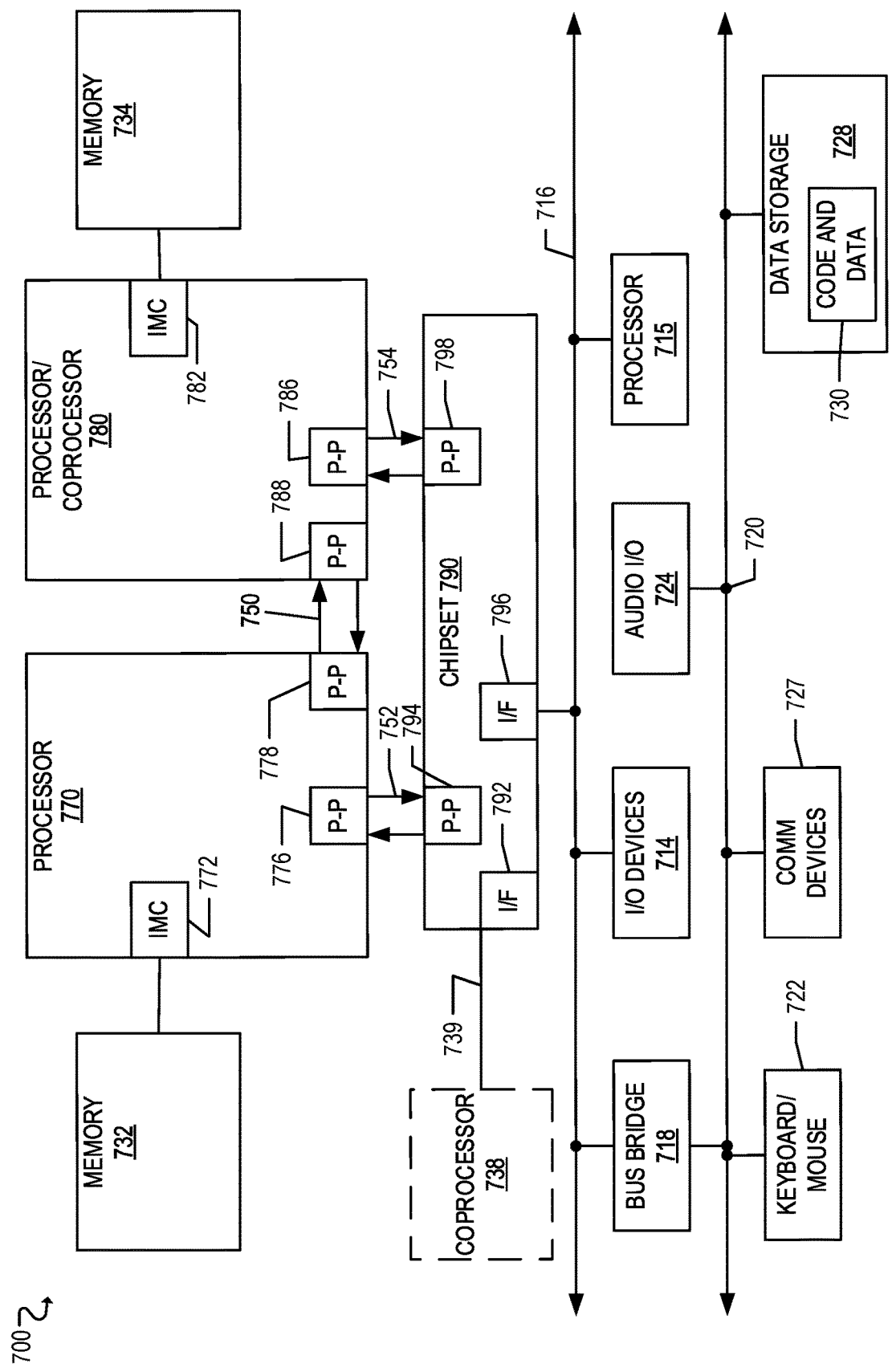

FIGS. 6 and 7 illustrate example computer processor architectures that can be used in accordance with embodiments disclosed herein. For example, in various embodiments, the computer architectures of FIGS. 6 and 7 may be used to implement the visual fog functionality described throughout this disclosure. Other embodiments may use other processor and system designs and configurations known in the art, for example, for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 6 illustrates a block diagram for an example embodiment of a processor 600. Processor 600 is an example of a type of hardware device that can be used in connection with the embodiments described throughout this disclosure. Processor 600 may be any type of processor, such as a microprocessor, an embedded processor, a digital signal processor (DSP), a network processor, a multi-core processor, a single core processor, or other device to execute code. Although only one processor 600 is illustrated in FIG. 6, a processing element may alternatively include more than one of processor 600 illustrated in FIG. 6. Processor 600 may be a single-threaded core or, for at least one embodiment, the processor 600 may be multi-threaded in that it may include more than one hardware thread context (or "logical processor") per core.

FIG. 6 also illustrates a memory 602 coupled to processor 600 in accordance with an embodiment. Memory 602 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 600 can execute any type of instructions associated with algorithms, processes, or operations detailed herein. Generally, processor 600 can transform an element or an article (e.g., data) from one state or thing to another state or thing.

Code 604, which may be one or more instructions to be executed by processor 600, may be stored in memory 602, or may be stored in software, hardware, firmware, or any suitable combination thereof, or in any other internal or external component, device, element, or object where appropriate and based on particular needs. In one example, processor 600 can follow a program sequence of instructions indicated by code 604. Each instruction enters a front-end logic 606 and is processed by one or more decoders 608. The decoder may generate, as its output, a micro operation such as a fixed width micro operation in a predefined format, or may generate other instructions, microinstructions, or control signals that reflect the original code instruction. Front-end logic 606 may also include register renaming logic and scheduling logic, which generally allocate resources and queue the operation corresponding to the instruction for execution.

Processor 600 can also include execution logic 614 having a set of execution units 616a, 616b, 616n, etc. Some embodiments may include a number of execution units dedicated to specific functions or sets of functions. Other embodiments may include only one execution unit or one execution unit that can perform a particular function. Execution logic 614 performs the operations specified by code instructions.

After completion of execution of the operations specified by the code instructions, back-end logic 618 can retire the instructions of code 604. In one embodiment, processor 600 allows out of order execution but requires in order retirement of instructions. Retirement logic 620 may take a variety of known forms (e.g., re-order buffers or the like). In this manner, processor 600 is transformed during execution of code 604, at least in terms of the output generated by the decoder, hardware registers and tables utilized by register renaming logic 610, and any registers (not shown) modified by execution logic 614.

Although not shown in FIG. 6, a processing element may include other elements on a chip with processor 600. For example, a processing element may include memory control logic along with processor 600. The processing element may include I/O control logic and/or may include I/O control logic integrated with memory control logic. The processing element may also include one or more caches. In some embodiments, non-volatile memory (such as flash memory or fuses) may also be included on the chip with processor 600.

FIG. 7 illustrates a block diagram for an example embodiment of a multiprocessor 700. As shown in FIG. 7, multi-processor system 700 is a point-to-point interconnect system, and includes a first processor 770 and a second processor 780 coupled via a point-to-point interconnect 750. In some embodiments, each of processors 770 and 780 may be some version of processor 600 of FIG. 6.

Processors 770 and 780 are shown including integrated memory controller (IMC) units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may optionally exchange information with the coprocessor 738 via a high-performance interface 739. In one embodiment, the coprocessor 738 is a special-purpose processor, such as, for example, a high-throughput MIC processor, a network or communication processor, compression engine, graphics processor, GPGPU, embedded processor, matrix processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of this disclosure is not so limited.

As shown in FIG. 7, various I/O devices 714 may be coupled to first bus 716, along with a bus bridge 718 which couples first bus 716 to a second bus 720. In one embodiment, one or more additional processor(s) 715, such as coprocessors, high-throughput MIC processors, GPGPU's, accelerators (such as, e.g., graphics accelerators or digital signal processing (DSP) units), matrix processors, field programmable gate arrays, or any other processor, are coupled to first bus 716. In one embodiment, second bus 720 may be a low pin count (LPC) bus. Various devices may be coupled to a second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to the second bus 720. Note that other architectures are possible. For example, instead of the point-to-point architecture of FIG. 7, a system may implement a multi-drop bus or other such architecture.

All or part of any component of FIG. 7 may be implemented as a separate or stand-alone component or chip, or may be integrated with other components or chips, such as a system-on-a-chip (SoC) that integrates various computer components into a single chip.

Embodiments of the mechanisms disclosed herein may be implemented in hardware, software, firmware, or a combination of such implementation approaches. Certain embodiments may be implemented as computer programs or program code executing on programmable systems comprising at least one processor, a storage system (including volatile and non-volatile memory and/or storage elements), at least one input device, and at least one output device.

Program code, such as code 730 illustrated in FIG. 7, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Automotive Ubiquitous Witness

Ubiquitous Witness use cases and related evidence solicitation protocols are presented in U.S. application Ser. No. 16/004,299, filed on Jun. 8, 2018 and entitled "Ubiquitous Visual Computing Witness", which is hereby incorporated by reference. One example use case may leverage a visual fog infrastructure along roads, in the network, and between the Fog platforms among automotive vehicles. For instance, a Ubiquitous Witness use case may trace critical roadside events, store data (e.g., camera data) associated with them for safe keeping, and replay the events on-demand based on data collected from multiple nearby witnesses (vehicles, pedestrians, cyclists, a camera mounted on a nearby building, lamp post or other type of road side unit (RSU), etc., where each may have captured slightly different perspectives of the event). Post-facto, the immersive multi-dimensional data may aid investigations of events (e.g., accidents) by concerned participants, legal authorities, and/or those responsible for the improvement of road conditions.

Figure 8:
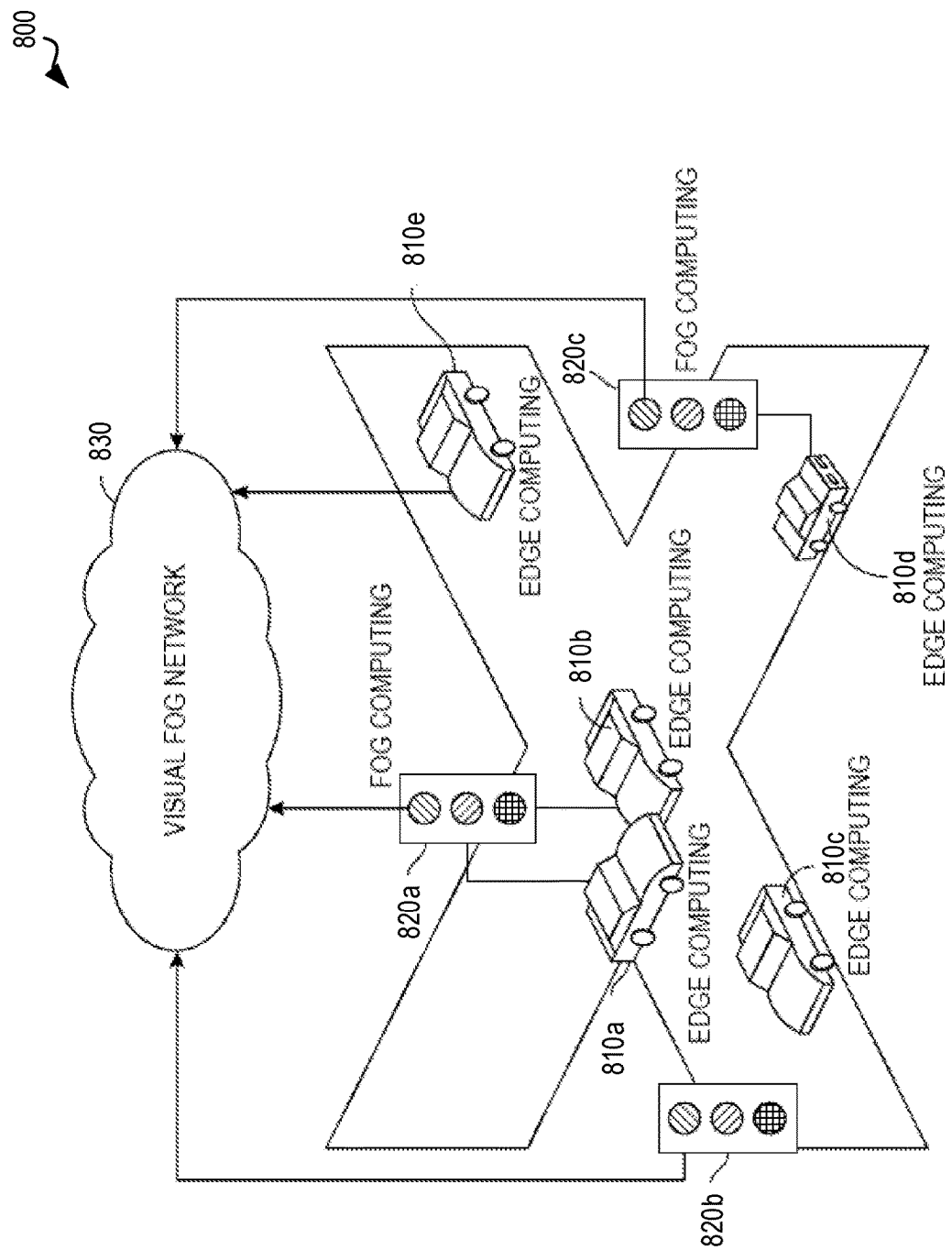
FIG. 8 illustrates an example use case for an automotive ubiquitous witness.

FIG. 8 illustrates an example use case 800 for an automotive ubiquitous witness. The illustrated use case 800 includes edge devices 810a-e, fog devices 820a-c, and a communication network 830. In the illustrated example, edge devices 810a-e are vehicles with onboard sensors and/or cameras for collecting data during operation, while fog devices 820a-c are traffic lights or other roadside units (RSUs) with sensors and/or cameras for local or nearby data collection. Moreover, communication network 830 may include visual fog and/or information-centric networking capabilities, which may be used to facilitate real-time collection and aggregation of data from both vehicles 810 and RSUs 820 using event-based data management and storage techniques. In this manner, a ubiquitous automotive witness may be implemented using a combination of visual fog computing (VFC) and visual fog networking or information-centric networking (ICN), as described further below in connection with FIG. 9.

Figure 9:
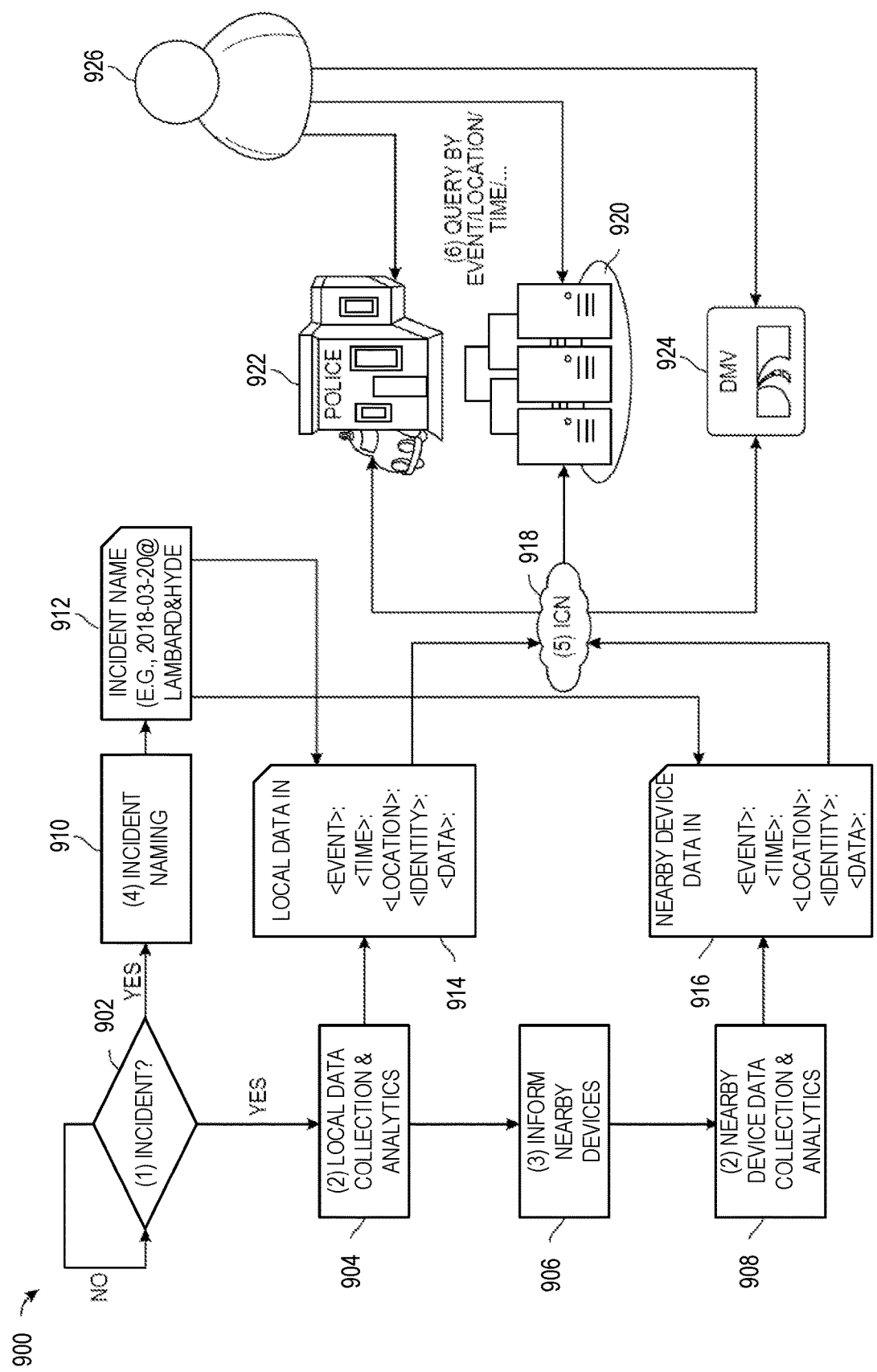
FIG. 9 illustrates an example dataflow 900 for a ubiquitous witness.

FIG. 9 illustrates an example dataflow 900 for a ubiquitous witness. In some embodiments, for example, dataflow 900 may be performed in connection with the example automotive use case illustrated in FIG. 8.

The illustrated dataflow begins at block 902 by determining whether an incident has been detected. In various embodiments, for example, an incident may be detected by processing sensor data using any suitable approach, such as identifying unexpected or outstanding changes in sensor data (e.g., data from internal sensors of vehicles and/or other types of equipment), performing event detection and recognition using computer-vision and/or machine learning techniques, and so forth.

Once an incident has been detected, that will trigger local data collection by the detecting device (block 904) along with nearby data collection by any surrounding devices (block 908), and the incident will also be given a name (block 910).

For example, at block 904, the detecting device performs local data collection, which may involve performing local analytics in order to acquire and/or generate data and/or metadata associated with the incident. The metadata, for example, may include or otherwise identify regions of interest (ROIs), geolocation names (e.g., addresses, cities, states, zip codes, landmarks, countries), tagging or labels on the scene of the incident derived using computer vision techniques (e.g., image classification or segmentation), weather, and/or any other contextual or circumstantial information associated with the incident, among other examples. Further, the relevant data may be designated with a high-priority QoS in order to ensure that the data is retained.

At block 906, mechanisms are then employed to inform nearby devices of the incident, which enables those devices to lock down their data as well as perform any other actions that may be appropriate in the particular circumstances and/or use case. For example, in the context of a neighborhood watch, ZigBee and/or LTE may be used to notify nearby devices of an incident for data collection purposes, while LTE and/or dedicated short-range communications (DSRC) may be used in the context of automobile incidents. Regardless of the underlying wireless communication infrastructure, an alert message is routed from the device that detected the incident to its neighbors in order to trigger the process of locking down the relevant data of the nearby or neighboring devices (block 908).

At block 910, the incident is then given a "name" for identification, routing, and/or networking purposes. In some embodiments, for example, the incident name may be derived using an arbitrary combination of information associated with the incident, such as location, time, event, type of incident, priority/importance/fatalities, image/video captured of the event, and so forth. In this manner, the concatenation of this descriptive information can serve as the event name 912 for purposes of requesting the underlying event data within an information-centric network (ICN), as described further below.

At block 918, for example, an information-centric network (ICN) may be used to request, route, and aggregate the relevant data (e.g., local device data 914 and/or nearby device data 916) based on the incident name (e.g., the attributes associated with the data). In this manner, the network can then route or be queried for data associated with a particular incident of interest. For example, evidence of theft in a neighborhood watch may be requested and subsequently directed to a nearby police station 922, while evidence of automobile speeding may be requested and subsequently directed to the department of motor vehicles (DMV) 924 and/or an insurance company.

Moreover, the data associated with an incident may also be stored by certain network resources 920 in order to satisfy subsequent queries relating to the incident. For example, at block 926, users may query for evidence associated with an incident using the various attributes in the incident name. For example, a user might only know the approximate time and place of an incident for purposes of querying the network, and thus the network can disseminate the query to the relevant data stores, and those with relevant data can then reply.

In this manner, a ubiquitous witness can be implemented by leveraging visual fog computing to perform data processing and/or pre-processing at edge and/or fog nodes, followed by using visual fog networking and/or information-centric networking (ICN) to associate and/or aggregate the collection of evidence for an incident (e.g., data and metadata from various sources), timely route the evidence to the appropriate destination(s), and/or store the evidence in the appropriate data stores.

In the illustrated embodiments, data offload and time synchronization techniques are described with respect to vehicles in an automotive ubiquitous witness use case. For example, road side units (RSUs) are described below as facilitating one or more aspects these techniques, where the RSUs are computing devices connected at or near the edge of a communications network (e.g., not in the Cloud). In other embodiments, however, the functionality of the RSUs can be distributed across any combination of devices and components deployed throughout an edge-to-cloud network topology, including at the edge, in the cloud, and/or anywhere in between in the "fog."

Further, although an automotive ubiquitous witness use case is indicated below, the techniques described below may be applied other types of ubiquitous witness use cases. For example, one or more functions performed by the RSUs in the examples described below may be performed by another type of edge computing node or fog computing node. In addition, the functions performed by the vehicles in the examples described below may be performed by another type of mobile user equipment (UE) endpoint, such as by a smart scooter, bicycle, or other pedestrian vehicle that includes mobile UE communication circuitry to wirelessly communicate with the edge/fog computing node, or by a smartphone, tablet, or other mobile computing device.

Data Offload from Vehicles to Fog Infrastructure

In many situations, the automotive ubiquitous witness use case may entail high volume data collection by each of the vehicles. For example, vehicles (e.g., autonomous vehicles) may capture and store sensor data from a number of sensors coupled to the vehicle (e.g., cameras or other vision sensors that are either integrated with the vehicle, or provided as "add-on" sensors to the vehicle) for a number of anomalous events witnessed by the vehicle during its daily journey. A vehicle may easily run out of storage capturing all this sensor data, especially if it encounters several events. In some situations, this may lead to the vehicle being unable to contribute to the Ubiquitous Witness process.

Accordingly, certain solutions for on-the-fly vehicle data offloads are presented. The vehicles may initiate the data offload solutions herein, for example, when the vehicle runs out of storage while traveling on the road, in response to detecting the occurrence of an event, or in response to a request to offload data associated with a particular event or events. The data offload solutions disclosed herein may leverage the visual fog infrastructure in each road segment to provide (i) an on-demand data offload service for each vehicle, (ii) a method for tracking what/where/when data was offloaded and stored, and (iii) a method for global aggregation of data by an interested party (e.g., city officials, traffic management services, government agencies (e.g., a department of motor vehicles (DVM) or department of transportation (DOT)), insurance companies, police, etc.) from the distributed storage elements, all while being economical and scalable.

Figure 10:
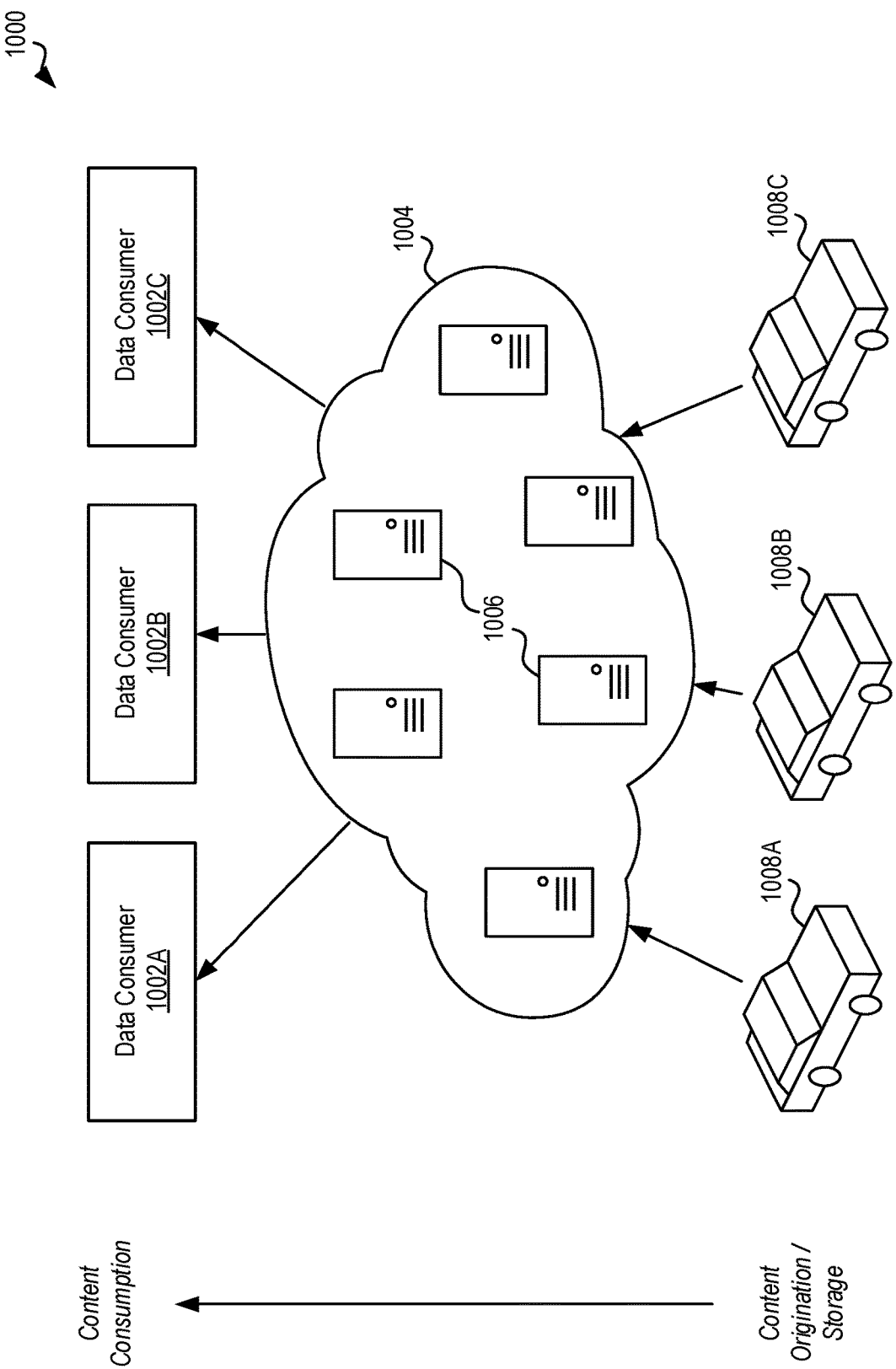
FIG. 10 illustrates an example reverse content delivery network (rCDN) for implementation with an automotive ubiquitous witness use case.

FIG. 10 illustrates an example reverse content delivery network (rCDN) for implementation with an automotive ubiquitous witness use case. In some cases, the automotive ubiquitous witness use case may be considered a new flavor of Content Delivery Network (CDN) in which the original content is the stored data in the vehicle (e.g., 1008) that is pushed/offloaded to storage points (e.g., 1006) close to the vehicle (e.g., over a wireless/cellular network link) and later accessed by end data consumers (e.g., 1002) for consumption. Thus, the automotive ubiquitous witness use case may be considered to be a reverse content delivery network (rCDN). In some instances, the rCDN may be implemented using the converged node techniques described in U.S. application Ser. No. 16/004,299, filed on Jun. 8, 2018 and entitled "Ubiquitous Visual Computing Witness", which is hereby incorporated by reference.

In the example shown, content originating from vehicles 1008 is uploaded/distributed to the rCDN servers/caches 1006 in the fog network 1004. The end data consumers 1002 later fetch the offloaded data from the servers/caches 1006 for consumption. In the automotive ubiquitous witness use cases, each road segment may offer data storage servers/caches 1006 in road platforms co-located with traffic lights, light posts, road signs, in gas/charging stations, and other roadside physical buildings or structures that can provide storage for sensor data from vehicles or other endpoints (e.g., video or other data). Any of these elements may be considered an RSU for the purpose of this disclosure. In some instances, the end data consumers 1002 use some storage record information from the vehicle (described below) to determine which server/cache 1006 to retrieve the data from.

Figure 11:
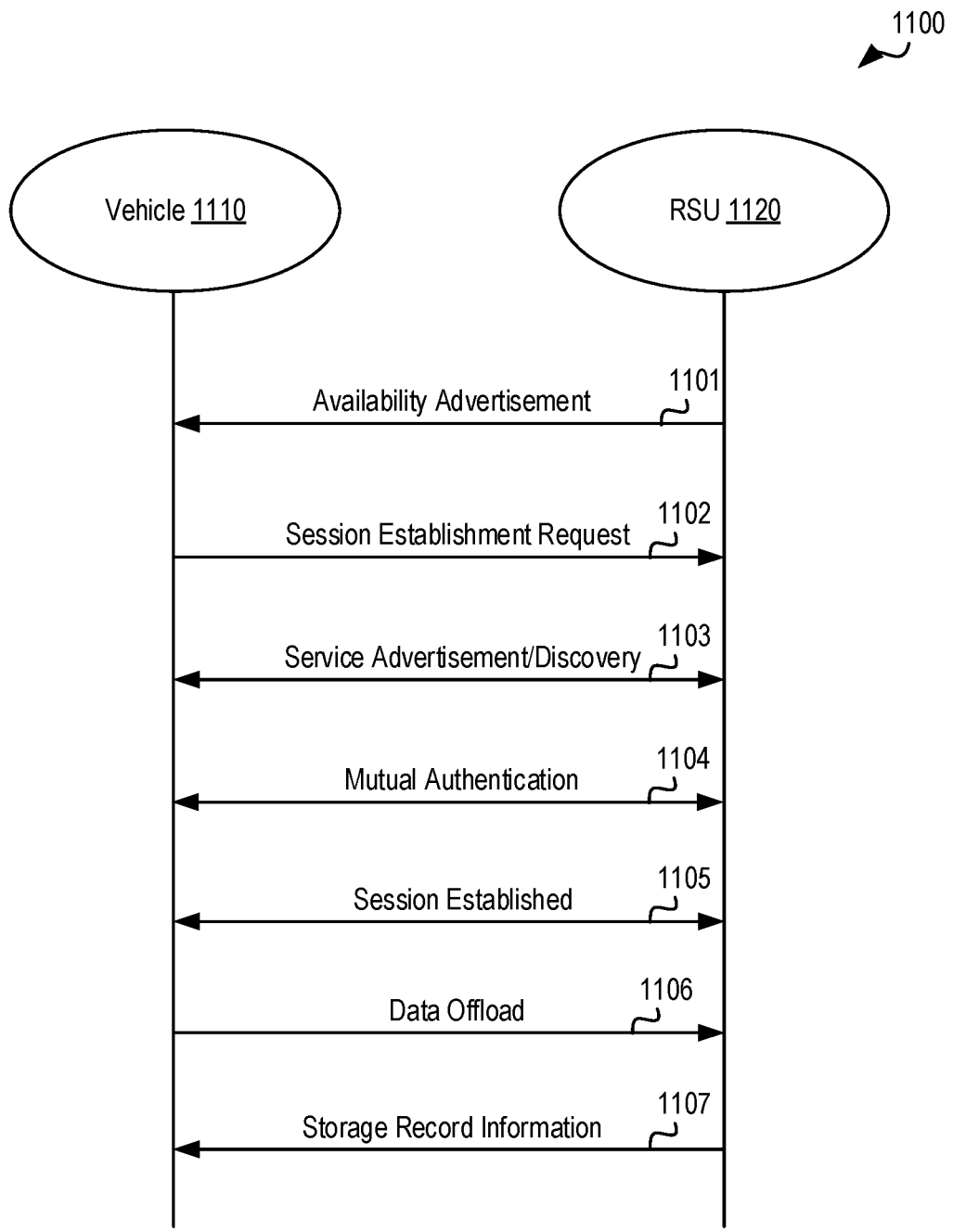
FIG. 11 illustrates a flowchart for an example process of data offloading in an automotive ubiquitous witness use case.

FIG. 11 illustrates a flowchart for an example process 1100 of data offloading in an automotive ubiquitous witness use case. In the example process 1100, an RSU 1120 first sends an availability advertisement at 1101 to the vehicle 1110. In certain embodiments, scoped availability advertisements may be continuously sent, indicating available storage on RSUs that can accommodate. In some cases, the availability advertisements are sent by the RSUs themselves. In other cases, the availability advertisements are sent by an RSU in the region that has been elected or otherwise chosen as a "leader" RSU for the road segment (e.g., based on geolocation, for example, an RSU closer to the crowded intersection or high-risk intersection). The leader RSU may advertise its own storage availability as well as the storage availabilities of other RSUs in the region, reducing broadcasting floods and potentially reaching a larger number of vehicles (e.g., given the particular geolocation of the leader RSU).

The vehicle 1110 may wish to offload at least some of its data to an RSU (e.g., 1120). The vehicle 1110 may do so, for example, when it detects that it has run out of storage or is about to run out of storage, in response to detecting the occurrence of an event, in response to a request to offload data associated with a particular event or events, or for another reason. The vehicle 1110 may accordingly look to offload its stored data to nearby storage resources. During this time, it may receive the advertisement from the RSU 1120, which is in the vicinity of the vehicle 1110. To do this, the vehicle 1110 may transmit a session establishment request to the RSU 1120 in response at 1102. The session establishment request may include a storage service discovery request, which may be sent to the RSU 1120 in real-time. In some cases, the session establishment request can be based on P2P service discovery mechanisms. The session establishment request may be received by the RSU with the availability, or by an elected leader RSU for the region.

The vehicle 1110 and RSU 1120 may then perform storage service advertisement and discovery processes at 1103, wherein certain capabilities are exchanged for storage service negotiation. For example, the RSU 1120 may advertise an amount of available storage, a maximum duration of storage for the data, a type of data accepted for storage, a service charge for storing the data, and privacy information related to storage of the data, and the vehicle 1110 may determine which data it may offload to the RSU 1120 based on the advertised information.

The vehicle 1110 and RSU 1120 may also perform a mutual authentication process at 1104. In some embodiments, authentication between the vehicle 1110 and the RSU 1120 may be facilitate through a third party authentication service. For example, in some cases, the vehicle 1110 may be subscribed to an authentication service provided by a trusted entity (e.g., an owner of the roadside infrastructure, such as a carrier, a municipality, etc.). The service can send a one-time password (OTP) to both the vehicle 1110 and the RSU 1120 during the authentication process 1104 so that the vehicle 1110 and RSU 1120 can mutually authenticate. An example process like this is shown in FIG. 12 and described further below.

After services are negotiated and the parties have authenticated, a data offload session is established at 1105, and the vehicle 1110 begins offloading sensor data at 1106. In some cases, the sensor data may be encrypted with a bulk encryption key (BEK) prior to being offloaded to the RSU 1120 at 1106. The BEK may be wrapped using a public BEK wrapping key (BWK) (e.g., an RSA asymmetric key), where the owner of the public key is a trusted entity (e.g., a municipality, traffic management service, government agency, insurance company, police, friend, self, etc.), and also offloaded with the encrypted sensor data. When the trusted entity wishes to retrieve or read the sensor data stored at the RSU 1120, it may obtain the wrapped BEK corresponding to their BWK, unwrap the BEK using the BWK, then decrypt the encrypted sensor data using the BEK. In some instances, an ICN may be used to store and propagate the wrapped BEKs, allowing multiple copies to exist at different RSUs, adding performance, redundancy, resiliency and availability benefits. In some embodiments, the RSU 1120 may require holders of BWKs to authenticate first using an authentication credential (e.g., a certificate, OAuth token, password, etc.) to establish that the BWK holder is the same entity the user intended should receive the BEK and cleartext sensor data. In embodiments where the sensor data is encrypted, content metadata may be exposed outside of the encrypted content. In this way, an ICN may access the metadata to allow/respond to queries for certain sensor data based on the metadata. In some cases, the sensor data and metadata may be packaged in a manifest such as IETF RFC 8152, which allows both encrypted and signed-cleartext contents.

After the vehicle has offloaded its data to the RSU 1120, the RSU 1120 generates and transmits storage record information for the data offloaded at 1106. The storage record information may be a database-like record. For instance, the storage record information may include a metadata description of the data that includes identifying information for the RSU to which the data was offloaded (e.g., so the vehicle, a data consumer, or another entity may locate the data at a later point in time). The storage record information may also include other information about the RSU, such as information about the physical location of the RSU. In some instances, the storage record information may include an identifier for a particular event witnessed by the vehicle (e.g., where the vehicle offloads the data in response to the occurrence of the event), a time associated with the occurrence of the particular event, or other information related to the particular event, so that an investigatory entity may later locate and access the sensor data associated with the event. An example process for accessing sensor data offloaded to RSUs is shown in FIG. 13 and described further below.

Figure 12:
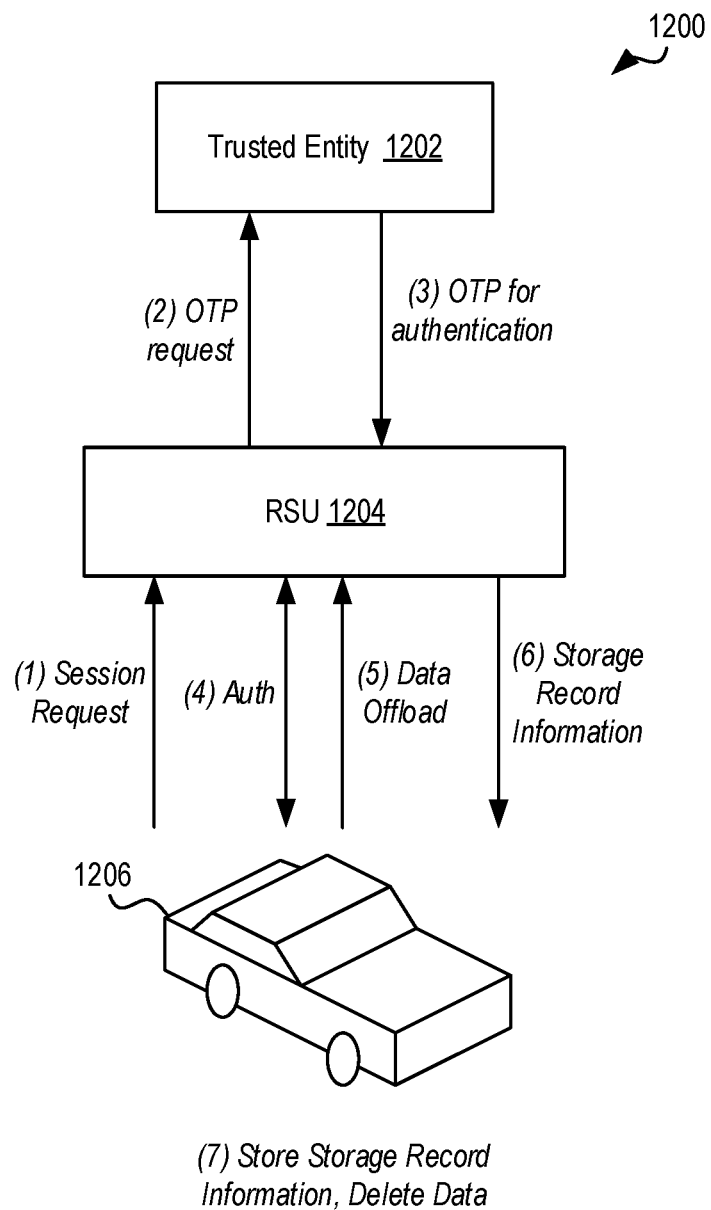
FIG. 12 illustrates an example dataflow for an example authentication in an automotive ubiquitous witness use case.

FIG. 12 illustrates an example dataflow 1200 for an example authentication in an automotive ubiquitous witness use case. In the example shown, a vehicle 1206 wishes to offload data to an RSU 1204 in its vicinity, as described above. To trust the RSU 1204, however, the vehicle 1206 might first want to authenticate the RSU 1204 to ensure that it is a legitimate sensor data storage location (versus a malicious actor trying to obtain the sensor data from the vehicle 1206) or for another reason. Likewise, the RSU 1204 may wish to authenticate the vehicle 1206 to ensure that the vehicle 1206 is not a malicious actor, to ensure the vehicle 1206 has privileges to offload data to the particular RSU 1204, or for another reason. To do this, authentication may be facilitated through a service provided by a trusted entity (e.g., an owner of the roadside infrastructure, such as a carrier, a municipality, etc.), where vehicles and/or RSUs are subscribed to the service.

For instance, in the example shown, the vehicle 1206 may first send a session establishment request as described above. In response, the RSU 1204 may request a one-time password (OTP) from the trusted entity 1202, and the trusted entity 1202 may send the OTP to each of the RSU 1204 and the vehicle 1206 for use in a mutual authentication protocol. After authentication, the vehicle 1206 may trust the RSU 1204 (and vice versa), so the vehicle 1206 may offload its data to the RSU 1204 and the RSU 1204 may provide storage record information to the vehicle 1206 as described above. Once the data is offloaded to the RSU 1204, the data may be deleted from the vehicle 1206.

Figure 13:
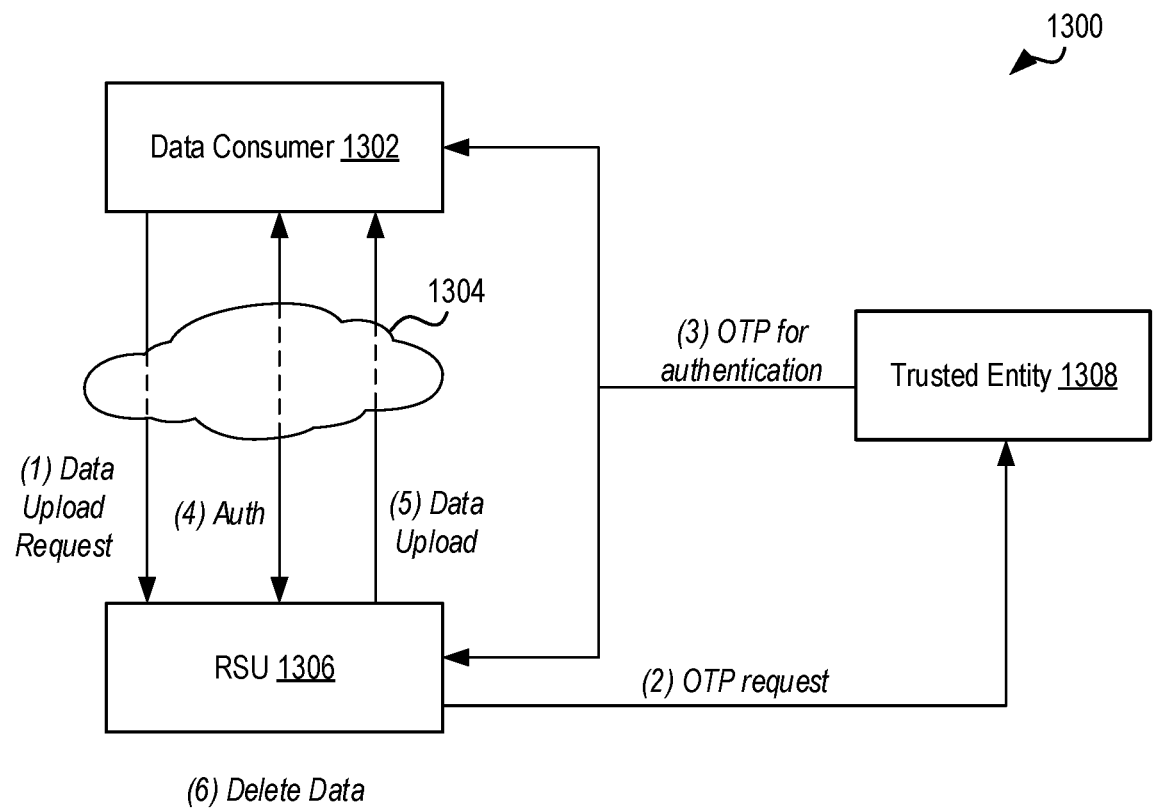
FIG. 13 illustrates an example dataflow for an example data upload in an automotive ubiquitous witness use case.

FIG. 13 illustrates an example dataflow 1300 for an example data upload in an automotive ubiquitous witness use case. In the example shown, a data consumer 1302 (e.g., an event investigator) wants to access sensor data previously offloaded from a vehicle and now stored at RSU 1306 for consumption (e.g., replay or recreation of an event witnessed by the vehicle). In the example shown, to access the data, the consumer 1302 sends a data upload request to the RSU 1306 over the network 1304. The network 1304 may be, in some embodiments, a wired network between the road infrastructure to the cloud where the data consumer 1302 resides. The data upload request may request data based on storage record information previously provided by the RSU 1306 to a vehicle.

For instance, in certain cases, the data consumer 1302 may be an event investigator collecting sensor data from Ubiquitous Witness vehicles for event replay/reconstruction. The investigator may collect sensor data from vehicles by asking for data associated with a particular event that the vehicle witnessed. The investigator may collect the sensor data either directly from the vehicle in response to the request or may receive record storage information from the vehicle in response to the request. In the latter case, the investigator may use RSU identifying information in the record storage information provided by the vehicle to query the identified RSU (e.g., 1306) to gather the sensor data.

Because the data consumer 1302 can be more than one entity, authentication may be desired by the RSU 1306 before initiating a data upload session with the consumer 1302. In some cases, authentication may be provided by a trusted third party entity (e.g., municipality, carrier, etc. serving the given road segment) that provides authentication credentials for the data consumer 1302, similar to the example shown in FIG. 12. For instance, in the example shown, the RSU 1306 sends a request to the trusted entity 1308 for a one-time password (OTP) in response to receiving the data upload request from the data consumer 1302. The trusted entity 1308 provides the OTP to the RSU 1306 and the data consumer 1302 for authentication, and after authentication, the RSU 1306 uploads the requested data to the data consumer 1302.

Once the data related is uploaded to and/or consumed by the data consumer 1302, the data may be deleted from the RSU 1306. For example, the RSU 1306 may delete the data immediately after transmitting to the consumer 1302, or may delete the data a period of time after the data is transmitted to the consumer 1302 (e.g., in case another data consumer also wishes to access the data from the RSU 1306). Other deletion policies or rules may be set as well.

Figure 14:
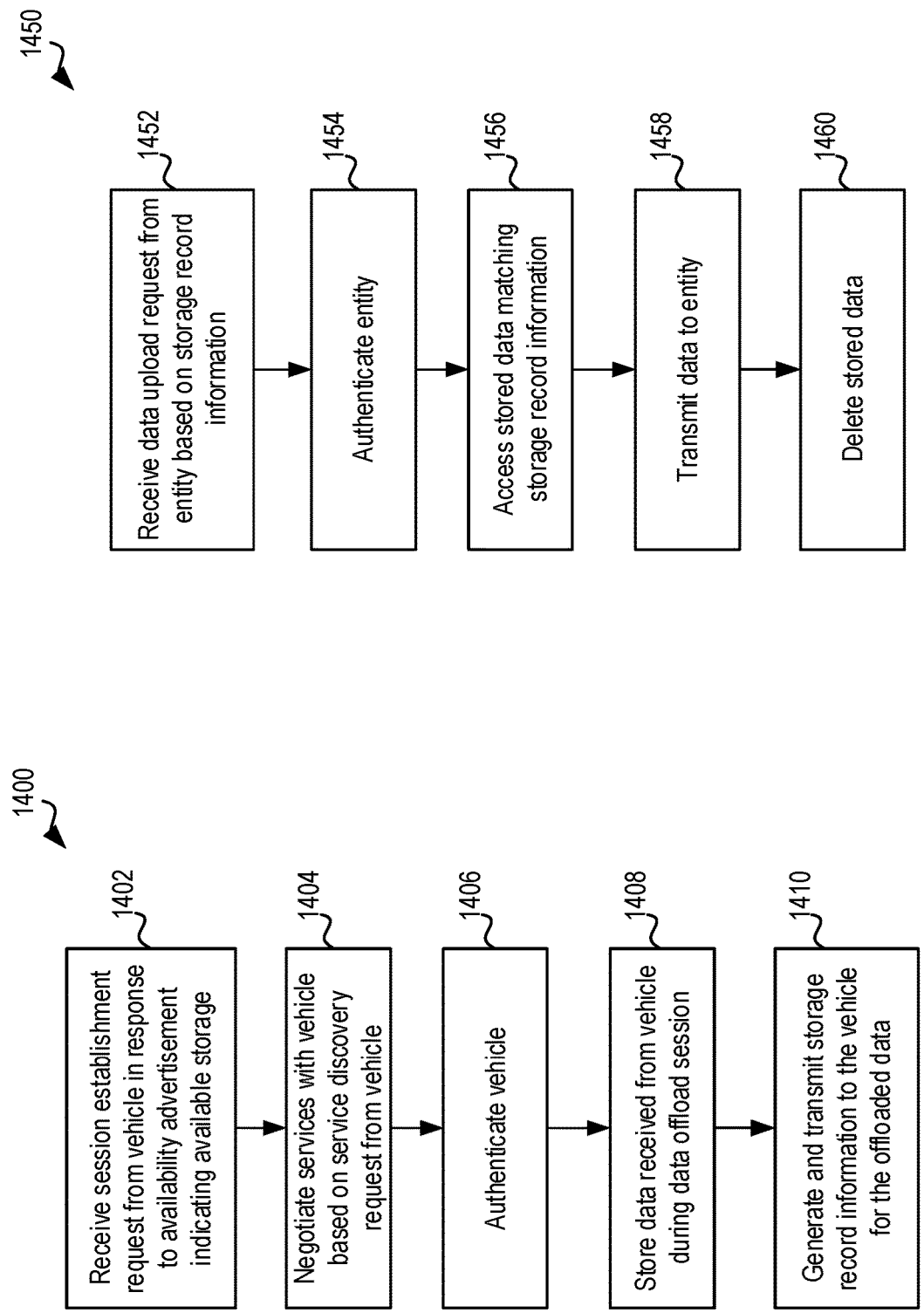
FIG. 14A illustrates a flowchart for an example process of establishing a data offload session between an RSU and a vehicle.
FIG. 14B illustrates a flowchart for an example process of establishing a data upload session between an RSU and a data consumer entity.

FIG. 14A illustrates a flowchart for an example process of establishing a data offload session between an RSU and a vehicle. Although the operations in the example process 1400 are described below as being performed by an RSU (e.g., RSU 1204 of FIG. 12), they may be performed by one or more components of a visual computing architecture and functionality described throughout this disclosure described throughout this disclosure. The example process 1400 may include additional or different operations, and the operations may be performed in the order shown or in another order. In some cases, one or more of the operations shown in FIG. 14A are implemented as processes that include multiple operations, sub-processes, or other types of routines. In some cases, operations can be combined, performed in another order, performed in parallel, iterated, or otherwise repeated or performed another manner. In some implementations, instructions stored on at least one machine accessible storage medium may be executable by at least one processor to cause the machine to perform the operations shown in FIG. 14A.

At 1402, an RSU receives a session establishment request from a vehicle in its vicinity. The request may be received at a wireless communication interface of the RSU, via any suitable wireless communication protocol (e.g., cellular protocol, vehicle-to-infrastructure (V2I) protocol, WiFi, WiGig, Bluetooth, etc.). The session establishment request may have been sent by the vehicle in response to an availability advertisement indicating available storage space on the RSU. The availability advertisement may have been sent by the RSU itself, or by another RSU in the road segment (e.g., an RSU chosen as a leader for a particular road segment, as described above).

At 1404, the RSU negotiates services with the vehicle. For instance, the vehicle may send the RSU a P2P service discovery request, and the RSU may advertise one or more services to the vehicle in response (e.g., an amount of available storage, a maximum duration of storage for the data, a type of data accepted for storage, a service charge for storing the data, and privacy information related to storage of the data).

At 1406, the RSU authenticates the vehicle. In some cases, the authentication is mutual between the RSU and the vehicle. Further, in some instances, the authentication may be facilitated by a third party entity, such as a carrier, municipality or other entity that manages the road segment of the RSU. The third party entity may provide a one-time password to both the vehicle and the RSU for use in authentication. Authentication may be performed in another manner as well.

At 1408, after the vehicle is authenticated and services have been negotiated between the vehicle and the RSU, the vehicle offloads data to the RSU and the RSU stores the data received from the vehicle in its memory. In some instances, the data may be encrypted based on a bulk encryption key (BEK), and the vehicle may also offload a wrapped BEK along with the data. The RSU may store both the encrypted data and the wrapped BEK for later retrieval. In some cases, metadata describing the data (e.g., location, time, event, or other information) may remain exposed so that an entity may locate the data based on a search of information in the metadata.

At 1410, the RSU generates storage record information for the data offloaded by the vehicle and transmits the storage record information to the vehicle (so the vehicle or other entity may later locate the offloaded data). In some cases, the data includes information (e.g., flags or other indicators) indicating an occurrence of a particular event witnessed by the vehicle, and the storage record information may accordingly include an identifier for the particular event, a time associated with the occurrence of the particular event, or other information about the event. In this manner, an entity may later search a set of storage record information provided by a number of vehicles to find matches for the particular event, and may use the storage record information to locate RSUs that are currently storing the sensor data associated with the particular event.

FIG. 14B illustrates a flowchart for an example process of establishing a data upload session between an RSU and a data consumer entity. Although the operations in the example process 1450 are described below as being performed by an RSU (e.g., RSU 1306 of FIG. 13), they may be performed by one or more components of a visual computing architecture and functionality described throughout this disclosure described throughout this disclosure. The example process 1450 may include additional or different operations, and the operations may be performed in the order shown or in another order. In some cases, one or more of the operations shown in FIG. 14B are implemented as processes that include multiple operations, sub-processes, or other types of routines. In some cases, operations can be combined, performed in another order, performed in parallel, iterated, or otherwise repeated or performed another manner. In some implementations, instructions stored on at least one machine accessible storage medium may be executable by at least one processor to cause the machine to perform the operations shown in FIG. 14B.

At 1452, an RSU receives a data upload request from an entity. The entity may wish to consume the data stored at the RSU. For example, the entity may be an investigator that wishes to access sensor data (e.g., images or video) associated with a particular location at a particular time of day, or sensor data associated with a particular event. The entity may be the vehicle that offloaded the data originally, a municipality, cellular carrier, police department, government agency, or another entity that wishes to consume the data stored at the RSU.

The data upload request may include information that is in, or based on, storage record information previously provided by the RSU to a vehicle after the vehicle had offloaded its data to the RSU (e.g., as described above). For example, the storage record information may indicate that the offloaded data is associated with the occurrence of a particular event, and the data upload request may identify the request (e.g., to query the RSU for all data associated with the event). As another example, the data upload request may identify the data specifically based on an identifier of the RSU (e.g., where the entity queries for specific data associated with particular storage record information).

At 1454, the entity is authenticated by the RSU. The authentication may be facilitated by a third party in some instances. For example, a third party may provide a one-time password or other credentials to the RSU. In other instances, the entity may directly provide credentials to the RSU.

At 1456, the RSU locates and accesses the data indicated by the data upload request, and at 1458 the RSU transmits the data to the entity. In some instances, at 1460, the RSU deletes the data from its memory (e.g., to clear up additional space for other data offloads from vehicles). For example, the RSU may delete the data immediately after transmitting to the entity at 1456, or may delete the data only after it has been requested a particular number of times (which may be predetermined) for consumption by one or more entities. In some instances, the RSU may delete the data only after a period of time after the data is received from the vehicle (e.g., regardless of whether the data has been requested by an entity for consumption). In other instances, the RSU continues to store the data for a specified period of time after transmitting the data to the entity (e.g., in case another entity may also wish to access the data from the RSU). In some instances, the RSU may delete the data when it detects that its available storage space is running low (e.g., the RSU may delete the data if it has been transmitted and the storage space is running low; otherwise, if the data has not yet been requested, the RSU may retain the data).

Time Synchronization for Ubiquitous Witness

One challenge presented by the Ubiquitous Witness is ensuring time synchronization of events originating on the different platforms used by each witness. The reconstruction of the timing of each event may be critical in some cases, especially for automotive crashes leading to the loss of lives or property or for any scenario where seamless video data splicing is expected (e.g., when multiple cameras contribute to an aggregated immersive file format such as MPEG-I for 360-degree video).

Accordingly, the present disclosure provides solutions that ensure time synchronization between the various platforms in any road segment contributing to a ubiquitous witness data vault. In some embodiments, for instance, time synchronization between different platforms contributing to the ubiquitous witness scenario may be provided by a universal clock in each region or road segment. The universal clock may be used by all platforms contributing to the Ubiquitous Witness to synchronize timestamps used in capturing sensor data, so that the data may be properly analyzed or reconstructed (e.g., between different sensors, such as cameras). In addition, in some embodiments, a time certificate technique may be utilized to provide trust in time synchronization information received by the different Ubiquitous Witness platforms. Further, in some embodiments, timing errors for different platforms (e.g., hardware, software, etc.) may be tracked. The observed errors may be analyzed and used to correct any timing errors noticed for particular platforms. By using one or more of these techniques, diverse platforms (e.g., from different hardware and/or software providers) may be used in synchronized manner within a Ubiquitous Witness use case.

Figure 15:
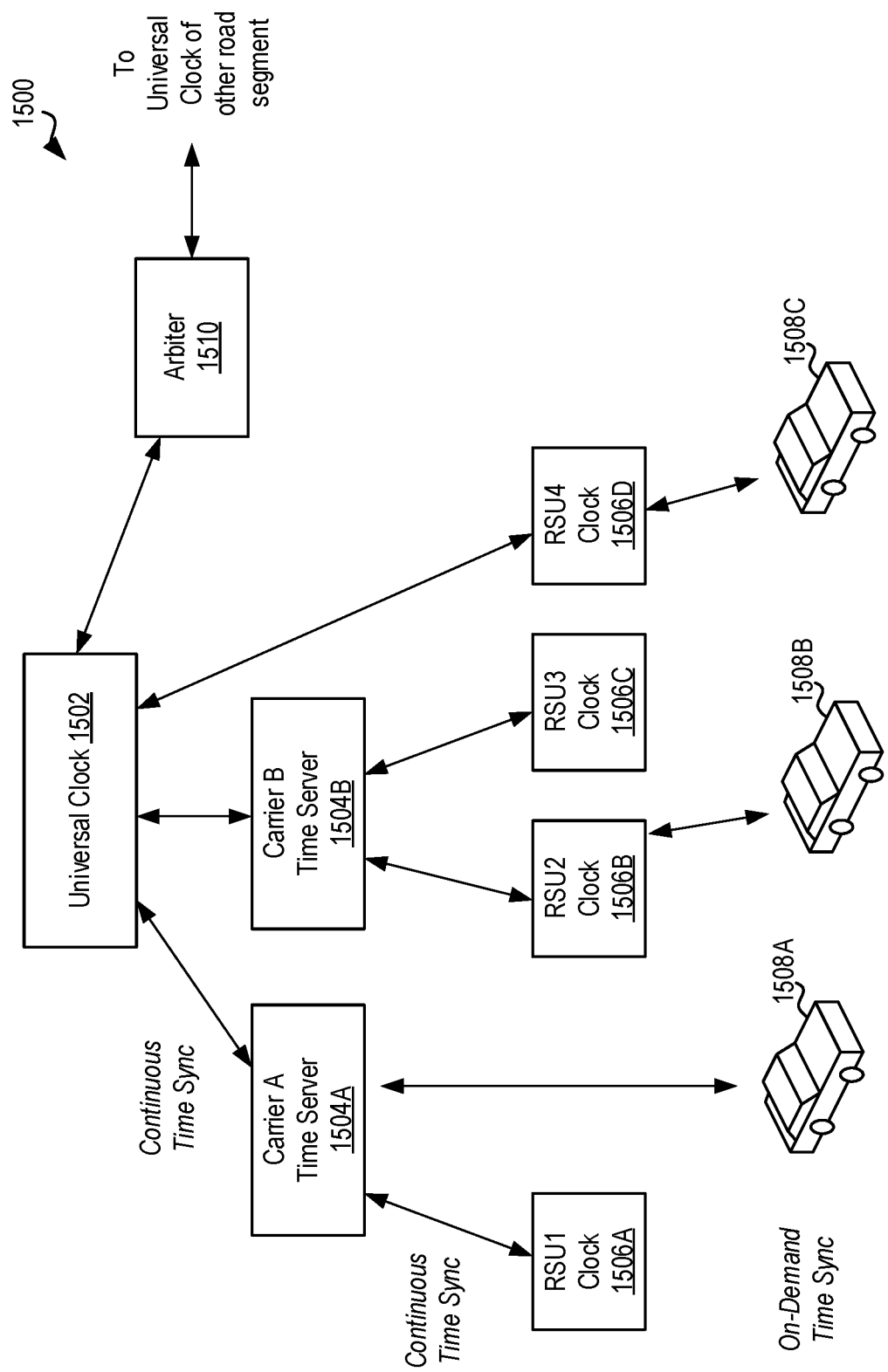
FIG. 15 illustrates an example time synchronization system for an automotive ubiquitous witness use case.

FIG. 15 illustrates an example time synchronization system 1500 for an automotive ubiquitous witness use case. In particular, the example system 1500 illustrates a universal clock 1502 for a road segment, which may be managed by a municipality, road traffic service, or a carrier for the road segment. The universal clock 1502 may maintain a "global" clock time that serves as a reference to each of the other devices in the system 1500.

In the example shown, two carriers (Carrier A and Carrier B) host their own time servers 1504 in the road segment. The time servers 1504 continuously synchronize their clocks with the clock maintained by the universal clock 1502. That is, the time servers 1504 may repeatedly or periodically send time synchronization requests to the universal clock 1502 to synchronize their clocks with the global clock.

Each RSU 1506 having cellular connectivity with a carrier may synchronize its clock with the clock maintained by its corresponding carrier time server 1504. For instance, in the example shown, RSU 1506A has cellular connectivity with Carrier A, and accordingly, synchronizes its clock with the time server 1504A. Likewise, RSUs 1506B, 1506C have cellular connectivity with Carrier B, and accordingly, synchronize their clocks with the time server 1504B. Carrier agnostic RSUs 1506 can synchronize their clocks directly with the universal clock 1502. For instance, in the example shown, the RSU 1506D connects directly to the universal clock 1502 to synchronize its clock. The RSUs 1506 may continuously synchronize their clocks with the time servers 1504 or with the universal clock 1502. In some instances, this may include the RSUs 1506 repeatedly or periodically sending time synchronization requests to the time servers 1504 or the universal clock 1502 to synchronize their clocks with the global clock.

The time synchronization requests and responses between the universal clock 1502, time servers 1504, and RSUs 1506 may be performed over a Time Sensitive Network (TSN) so that elapsed time or latency introduced by the network synchronization overhead is corrected as part of clock skew adjustments. Additionally, the time synchronization algorithms performed by the universal clock 1502, time servers 1504, and RSUs 1506 may be performed using time sensitive/real-time execution environments, where jitter introduced by processing is reduced and a predictable processing overhead has very low variance. Such overhead (latency) may be adjusted for when setting (and resetting) clocks as part of the synchronization processes.

The vehicles 1508 may synchronize their clocks with the carrier time servers 1504 over a cellular connection (e.g., where the vehicle has a cellular subscription with the particular carrier) or with the RSUs 1506 in the road segment over a wireless connection. For instance, in the example shown, the vehicle 1508A synchronizes its clock with the carrier time server 1504A directly, while the vehicles 1508B, 1508C synchronize their clocks with the RSUs 1506B, 1506E, respectively. The vehicles 1508 may synchronize in an on-demand manner to synchronize their clocks with the global clock, as opposed to the continuous manner in which the carrier time servers 1504 and RSUs 1506 synchronize their clocks.

In instances where data capture occurs at a boundary between two road segments that belong to different municipalities, an arbiter (e.g., 1510) can be implemented to arbitrate differences in the universal clocks maintained in each road segment (e.g., caused by clock drift). The arbiter can be located in the cloud, at the edge, or in the network between the edge and cloud to arbitrate clock differences across municipalities and normalize timestamps in each road segment. The arbiter 1510 may track change in clock values based on logs from the time servers and/or RSUs. For instance, each clock may log changes to its clock value, including the number of ticks added/removed from the clock. A time certificate and other clock update related telemetry may be recorded in the log as well. A hash of the log may be integrity-protected using an integrity register, such as a Trusted Platform Module (TPM) Platform Configuration Register (PCR). Actual clock ticks may be counted and maintained in the log for later forensic review by the arbiter 1510. Through analyzing the logs, the arbiter 1510 may observe clock skew by counting ticks and by adding/subtracting the ticks implied by the clock synchronization messages.

When time synchronization occurs over the cellular network (e.g., between vehicle 1508A and time server 1508A) no special trust relationship may be needed, since the cellular-based communication may have some implicit trust built in. However, when time synchronization occurs between vehicles and RSUs (whether by cellular connection, vehicle-to-infrastructure (V2I), or other wireless connectivity protocols (e.g., WiFi, WiGig, Bluetooth, etc.)), a trust protocol may be implemented to ensure trust in the time information received by the vehicles.

Figure 16:
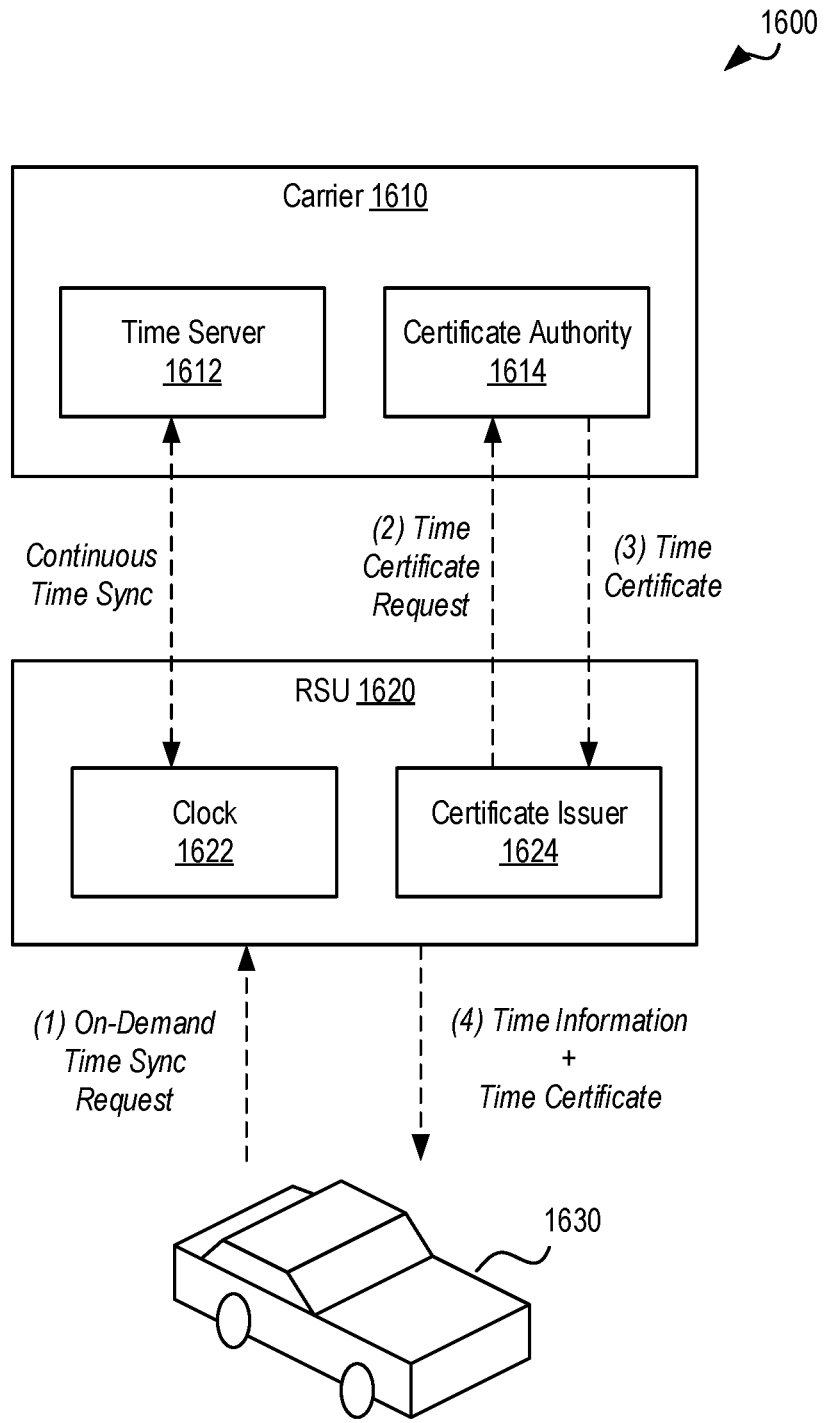
FIG. 16 illustrates an example data flow for time synchronization in an automotive ubiquitous witness use case using time certificates.

FIG. 16 illustrates an example data flow 1600 for time synchronization in an automotive ubiquitous witness use case using time certificates. In the example shown, a carrier 1610 maintains a time server 1612 (which may be implemented similar to the time servers 1504 of FIG. 15) and a certificate authority 1614 that issues keys for time certificates. An RSU 1620 maintains a clock 1622 and synchronizes the clock 1622 continuously with the time server 1612 as described above. In addition, the RSU 1620 maintains a certificate issuer 1624 that communicates with the certificate authority 1614.

In the example shown, the vehicle 1630 issues an on-demand time synchronization request to the RSU 1620 to synchronize its own clock. In addition to providing time information to the vehicle 1630 in response to the synchronization request from the vehicle 1630, the RSU 1620 may also provide a time certificate that provides the vehicle 1630 with a level of trust for the time information received. In particular, in response to the on-demand time synchronization request from the vehicle 1630, the certificate issuer 1624 of the RSU 1620 may issue a time certificate request to the certificate authority 1614 of the carrier 1610. In response, the certificate authority 1614 may issue a time certificate to the certificate issuer 1624, which is then provided to the vehicle 1630 by the RSU 1620 along with the time synchronization information.

In some embodiments, the on-demand time synchronization request from the vehicle 1630 may include the vehicle's clock value, which may be compared with the certificate authority's clock value. The certificate authority 1614 may correct for latency, jitter and other timing related noise that may be introduced by the network, and may calculate the likely clock skew between the certificate authority 1614 and the vehicle 1630. The certificate authority 1614 may then select an adjusted time value that accounts for the likely latency introduced by the return path from the certificate authority 1614 to the certificate issuer 1624. The adjusted time value may be included in the time certificate and delivered to the vehicle 1630.

The vehicle 1630 may implement a time sensitive certificate processing function that sets the vehicle clock. The time sensitive certificate processing function may be guaranteed to complete in a fixed amount of time such that the jitter involved is minimized. Similarly, the certificate issuance procedure implanted by the certificate authority may apply a similar quality of service (QoS) performance requirement where jitter is minimized on the certificate issuance process. The certificate authority 1614 and vehicle 1630 may employ Time Sensitive Networking (TSN) to perform the exchange shown in FIG. 16 to improve the certificate authority clock skew calculation and thus, the adjusted time value included in the certificate provided to the vehicle 1630.

Figure 17:
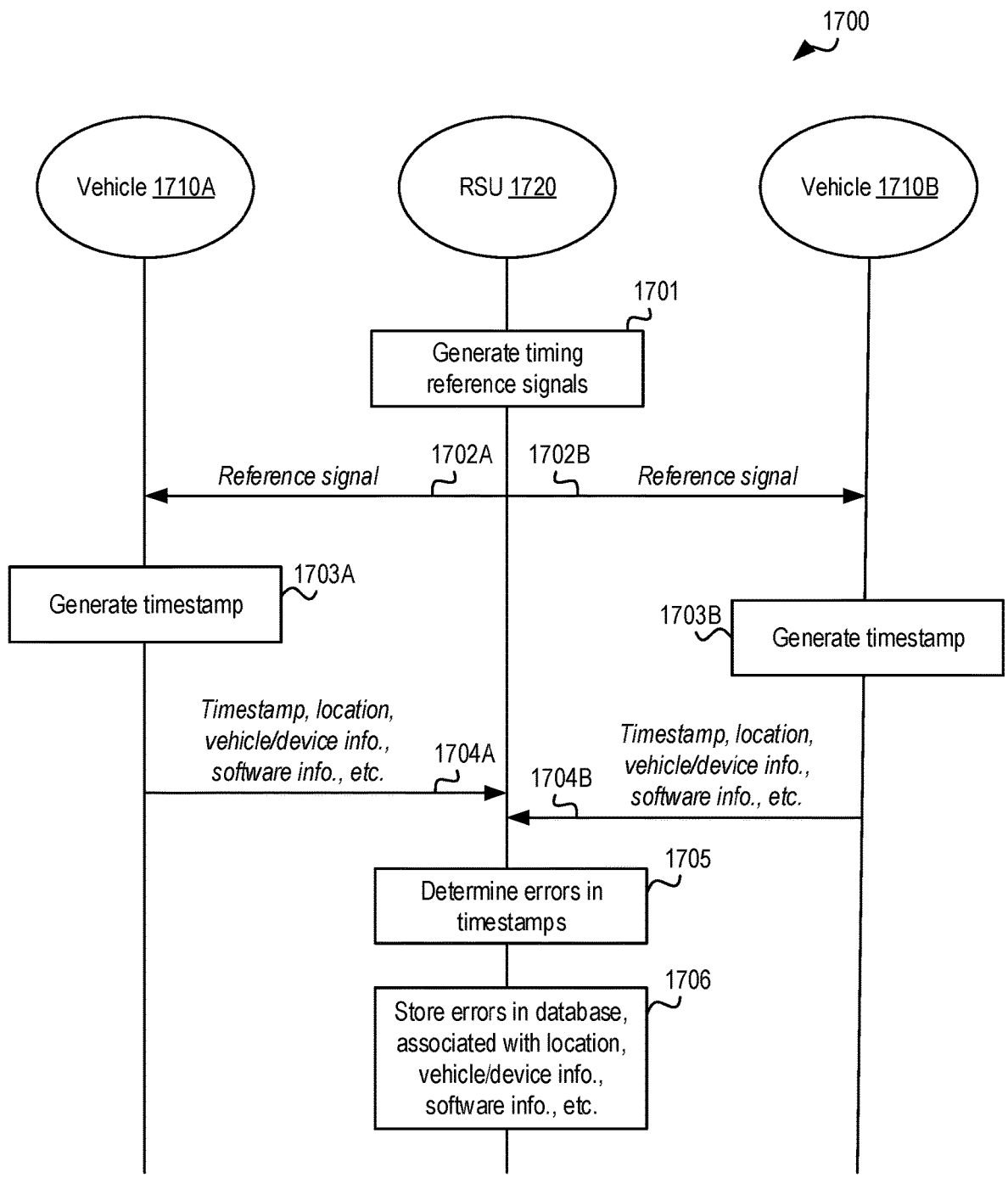
FIG. 17 illustrates a flowchart for an example time error determination process in an automotive ubiquitous witness use case.

FIG. 17 illustrates a flowchart for an example time error determination process 1700 in an automotive ubiquitous witness use case. In some instances, finer granularity of time synchronization may be desired, requiring much tighter tracking of any drift in time synchronizations. In addition, in some instances, differences in hardware or software of end devices can cause differences in the timestamps generated by the devices (since different operating systems may count clock ticks differently, or processor clocks used within different devices may vary). For example, a first vehicle running a first system might have a slight delay in the timestamps generated by a second vehicle running a second system, even though the vehicles' clocks were synchronized according to the processes described above. Thus, it may be desirable to ensure that an overall time synchronization process captures information such as the amount of error introduced by particular systems, so that such error may be accounted for as appropriate.

In the example shown, to determine potential errors in the time synchronization process described above, an RSU 1720 may generate timing reference signals at 1701 and send the signals to vehicles in its vicinity at 1702. The timing references signal may be broadcast to control for timing. The reference signals may, in some embodiments, be reference beacons meant for time synchronization at the OS level. Each vehicle 1710 then generates a timestamp of the received beacon at 1703 and returns the generated timestamps to the RSU 1720. In addition to the timestamps, the vehicles 1710 may send their device hardware and/or software system information, location, or other information. The RSU 1720 may then determine errors/inaccuracies in the timestamps at 1705, and may build a database at 1706 of the determined errors/inaccuracies based on the vehicle system information, type of device, given information on round-trip propagation delay, type of operating system of other software being used, etc.

The database can them be used to determine approximate timing errors introduced by different devices/platforms and/or location information for devices sending beacon signals. For example, the RSU 1720 may send multiple beacon signals to the vehicles 1710 and build a history of performance telemetry that is then used to predict the latency, jitter, or other factors that may introduce discrepancy between the time at the RSU 1720 and the time at a given vehicle 1710. The RSU 1720 may analyze and use the history to correct for timing errors. Additionally, the RSU 1720 may repeat the protocol shown in FIG. 17 multiple times where anomalistic timestamp values are excluded and the timing error/correction value is selected from the most relevant measurements.

Figure 18:
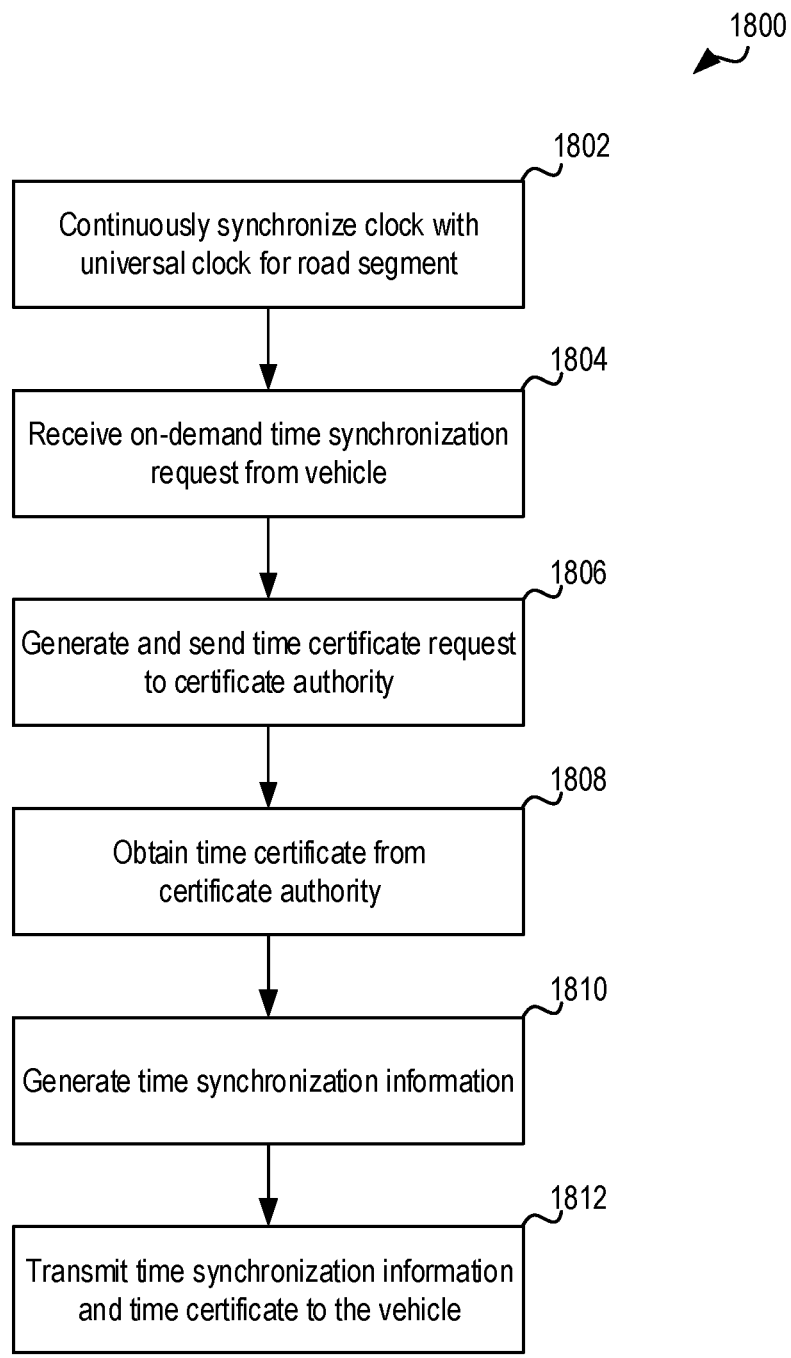
FIG. 18 illustrates a flowchart for an example process of synchronizing clocks in a ubiquitous witness use case.

FIG. 18 illustrates a flowchart for an example process 1800 of synchronizing clocks in a ubiquitous witness use case. Although the operations in the example process 1800 are described below as being performed by an RSU (e.g., RSU 1620 of FIG. 16 or RSU 1720 of FIG. 17), they may be performed by one or more components of a visual computing architecture and functionality described throughout this disclosure described throughout this disclosure. The example process 1800 may include additional or different operations, and the operations may be performed in the order shown or in another order. In some cases, one or more of the operations shown in FIG. 18 are implemented as processes that include multiple operations, sub-processes, or other types of routines. In some cases, operations can be combined, performed in another order, performed in parallel, iterated, or otherwise repeated or performed another manner. In some implementations, instructions stored on at least one machine accessible storage medium may be executable by at least one processor to cause the machine to perform the operations shown in FIG. 18.

At 1802, an RSU continuously maintains its clock with a universal clock of the road segment in which the RSU resides. For example, the RSU may ping the universal clock in a quick periodic manner (e.g., every few seconds, every few minutes, etc.) to continuously maintain synchronization with the universal clock. The universal clock time may be obtained directly from the universal clock (or an entity that manages it), or from a time server clock that is itself synchronized with the universal clock (e.g., a carrier or municipality time server as shown in FIG. 15 and described above).

At 1804, the RSU receives an on-demand time synchronization request from a vehicle in its vicinity. The request may be received at a wireless communication interface of the RSU, via any suitable wireless communication protocol (e.g., cellular protocol, vehicle-to-infrastructure (V2I) protocol, WiFi, WiGig, Bluetooth, etc.).

At 1806, the RSU generates a time certificate request and transmits the time certificate request to a certificate authority. The certificate authority may be maintained by a carrier, municipality, or other manager of the road segment in which the RSU resides. At 1808, the RSU receives a time certificate back from the certificate authority in response to its time certificate request.

At 1810, the RSU generates time synchronization information to send to the vehicle. The time synchronization information may include the time maintained by the RSU clock (which is itself synchronized with the universal clock). In some cases, the time synchronization information may include an adjusted time based on timing errors indicated for the particular vehicle platform (e.g., hardware, software, or both). For instance, the RSU may analyze a database of timing errors determined according to the protocol described above with respect to FIG. 17, and may determine an average or median timing error for platforms like the vehicle. The RSU may adjust the time maintained by its own clock by the average or median timing error, and provide the adjusted time to the vehicle so that the vehicle clock is more likely to be in synchronization with the RSU clock. In other cases, the time synchronization information may include the timing error information along with the time maintained by the RSU clock, to allow the vehicle to determine whether to adjust its clock synchronization accordingly.

At 1812, the time synchronization information and time certificate are both transmitted to the vehicle. The vehicle may trust the time synchronization information provided based on the time certificate also provided. For instance, the vehicle may use a key identified by the certificate to sign application information, where the time sync value in the certificate provides a clock synchronization point used by signature verifiers to evaluate believability of timestamp information included with signed data. The vehicle may accordingly use the time certificate to attest that the clock used to produce a timestamp was set according to the certified clock sync point.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing disclosure outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

As used throughout this specification, the term "processor" or "microprocessor" should be understood to include not only a traditional microprocessor (such as Intel's® industry-leading x86 and x64 architectures), but also graphics processors, matrix processors, and any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

EXAMPLE IMPLEMENTATIONS

The following examples pertain to embodiments described throughout this disclosure. In the examples described below, an apparatus may include an edge computing node or a fog computing node as described above, which performs the techniques described herein based on communications with one or more mobile user equipment (UE) endpoints. For instance, in some examples, the apparatus may be a road side unit (RSU) and the endpoint may be a vehicle (e.g., an autonomous car, smart scooter, smart bicycle, or other type of vehicle) that includes mobile UE communication circuitry to wirelessly communicate with the RSU. In some examples, the apparatus may be an RSU and the endpoint may be a smartphone, tablet, or other mobile computing device in possession of a pedestrian.

One or more embodiments may include an apparatus comprising memory and a processor, which comprises circuitry to: establish a data offload session with an endpoint in the vicinity of the apparatus based on a session establishment request sent by the endpoint; store data received from the endpoint during the data offload session in the memory, the data comprising sensor data for one or more sensors coupled to the endpoint; generate storage record information for the data stored in the memory, the storage record information comprising identifying information for the apparatus; and cause the storage record information to be transmitted to the endpoint.

In one example embodiment of an apparatus, the processor circuitry is further to: generate an availability advertisement indicating available storage space in the memory of the apparatus; and cause the availability advertisement to be transmitted to the endpoint. In some examples, the apparatus is a first apparatus, and the processor circuitry is to cause a second apparatus to transmit the availability advertisement to the endpoint.

In one example embodiment of an apparatus, the processor circuitry to establish the data offload session is further to authenticate the endpoint based on information in the session establishment request. In some examples, the processor circuitry is to authenticate the endpoint based on a one-time password provided by a third party.

In one example embodiment of an apparatus, the processor circuitry to establish the data offload session is further to advertise services to the endpoint based on a service discovery request from the endpoint. In some examples, the processor circuitry is to advertise one or more of advertise an amount of available storage, a maximum duration of storage for the data, a type of data accepted for storage, a service charge for storing the data, and privacy information related to storage of the data.

In one example embodiment of an apparatus, the processor circuitry is further to: process a data upload request from an entity, the data upload request requesting the data based on the storage record information; cause the data to be transmitted to the entity for consumption; and delete the data from the memory after the data has been transmitted to the entity. In some examples, the processor circuitry to process the data upload request is further to authenticate the entity based on information in the data upload request.

In one example embodiment of an apparatus, the data received from the endpoint is encrypted based on a bulk encryption key (BEK), and the processor circuitry is further to store a wrapped BEK received from the endpoint during the data offload session in the memory.

One or more embodiments may include at least one machine accessible storage medium having instructions stored thereon, wherein the instructions, when executed on a machine, cause the machine to: process a session establishment request sent by an endpoint in the vicinity of an apparatus; establish a data offload session between the endpoint and the apparatus based on the session establishment request; store data received from the endpoint during the data offload session in a memory coupled to the apparatus, the data comprising sensor data for one or more sensors coupled to the endpoint; generate storage record information for the stored data, the storage record information comprising identifying information for the apparatus; and cause the storage record information to be transmitted to the endpoint.

In one example embodiment of a storage medium, the instructions further cause the machine to cause an availability advertisement to be transmitted, the availability advertisement indicating available storage space in the memory.

In one example embodiment of a storage medium, the instructions further cause the machine to authenticate the endpoint based on information in the session establishment request.

In one example embodiment of a storage medium, the instructions further cause the machine to advertise services to the endpoint based on a service discovery request from the endpoint.

In one example embodiment of a storage medium, the instructions further cause the machine to: process a data upload request from an entity, the data upload request requesting the data based on the storage record information; cause the data to be transmitted to the entity for consumption based on the data upload request; and delete the data from the memory after the data has been transmitted to the entity.

One or more embodiments may include a method, comprising: receiving, at an apparatus, a session establishment request from an endpoint in the vicinity of the apparatus; establishing a data offload session between the endpoint and the apparatus based on the session establishment request; receiving data from the endpoint during the data offload session, the data comprising sensor data for one or more sensors coupled to the endpoint; storing the data in a memory coupled to the apparatus; generating storage record information for the stored data, the storage record information comprising identifying information for the apparatus; and transmitting the storage record information from the apparatus to the endpoint.

In one example embodiment of a method, the session establishment request is based on an availability advertisement received by the endpoint indicating available storage space in the memory. In some examples, the availability advertisement is transmitted by the apparatus. In some examples, the apparatus is a first apparatus and the availability advertisement is transmitted by a second apparatus communicably coupled to the first apparatus.

In one example embodiment of a method, the data further comprises information indicating an occurrence of a particular event, and the storage record information further comprises one or more of an identifier for the particular event and a time associated with the occurrence of the particular event.

In one example embodiment of a method, the method further comprises: receiving, at the apparatus, a data upload request from an entity, the data upload request requesting the data based on the storage record information; transmitting the data to the entity for consumption in response to the data upload request; and deleting the data from the memory after the data has been transmitted to the entity.

One or more embodiments may include a system, comprising means to perform one or more of the example methods above.

One or more embodiments may include an apparatus comprising: a clock and a processor, which comprises circuitry to: continuously synchronize the clock based on a time maintained by a universal clock communicably coupled to the apparatus; and generate, in response to an on-demand request from a endpoint in the vicinity of the apparatus, a time synchronization signal to synchronize a clock of the endpoint with the clock of the apparatus; and cause the time synchronization signal to be transmitted to the endpoint.

In one example embodiment of an apparatus, the processor circuitry is further to: generate a time certificate request; cause the time certificate request to be transmitted to a certificate authority; obtain a time certificate based on the time certificate request; and cause the time certificate to be transmitted to the endpoint with the time synchronization signal.

In one example embodiment of an apparatus, the processor circuitry is further to obtain the time maintained by the universal clock from an entity that maintains the universal clock.

In one example embodiment of an apparatus, the processor circuitry is further to obtain the time maintained by the universal clock from a time server clock that is based on the universal clock.

In one example embodiment of an apparatus, the processor circuitry is further to: cause a reference signal to be transmitted to one or more endpoints in the vicinity of the apparatus; process return signals from the endpoints, each return signal comprising a timestamp and one or more of hardware information or software information for the particular endpoint that generated the return signal; determine time synchronization errors based on the timestamps in the return signals; and store the time synchronization errors in a database, wherein each time synchronization error in the database is associated with the hardware information and software information in the return signal corresponding to the determined time synchronization error.

What is claimed is:

1. A road side unit (RSU) comprising:
   memory; and
   a processor comprising circuitry to:
     establish a data offload session with a vehicle in the vicinity of the RSU based on a session establishment request sent by the vehicle;
     store data received from the vehicle during the data offload session in the memory, the data comprising sensor data for one or more sensors coupled to the vehicle;
     generate storage record information for the data stored in the memory, the storage record information comprising information identifying the RSU; and
     cause the storage record information to be transmitted to the vehicle.

2. The RSU of claim 1, wherein the processor circuitry is further to:
   generate an availability advertisement indicating available storage space in the memory of the RSU; and
   cause the availability advertisement to be transmitted to the vehicle.

3. The RSU of claim 2, wherein the RSU is a first RSU, and the processor circuitry is to cause a second RSU to transmit the availability advertisement to the vehicle.

4. The RSU of claim 1, wherein the processor circuitry to establish the data offload session is further to authenticate the vehicle based on information in the session establishment request.

5. The RSU of claim 4, wherein the processor circuitry is to authenticate the vehicle based on a one-time password provided by a third party.

6. The RSU of claim 1, wherein the processor circuitry to establish the data offload session is further to advertise services to the vehicle based on a service discovery request from the vehicle.

7. The RSU of claim 6, wherein the processor circuitry is to advertise one or more of advertise an amount of available storage, a maximum duration of storage for the data, a type of data accepted for storage, a service charge for storing the data, and privacy information related to storage of the data.

8. The RSU of claim 1, wherein the processor circuitry is further to:
   process a data upload request from an entity, the data upload request requesting the data based on the storage record information;
   cause the data to be transmitted to the entity for consumption; and
   delete the data from the memory after the data has been transmitted to the entity.

9. The RSU of claim 8, wherein the processor circuitry to process the data upload request is further to authenticate the entity based on information in the data upload request.

10. The RSU of claim 1, wherein the data received from the vehicle is encrypted based on a bulk encryption key (BEK), and the processor circuitry is further to store a wrapped BEK received from the vehicle during the data offload session in the memory.

11. At least one machine accessible storage medium having instructions stored thereon, wherein the instructions, when executed on a machine, cause the machine to:
   process a session establishment request sent by a vehicle in the vicinity of a road side unit (RSU);
   establish a data offload session between the vehicle and the RSU based on the session establishment request;
   store data received from the vehicle during the data offload session in a memory coupled to the RSU, the data comprising sensor data for one or more sensors coupled to the vehicle;
   generate storage record information for the stored data, the storage record information comprising information identifying the RSU; and
   cause the storage record information to be transmitted to the vehicle.

12. The storage medium of claim 11, wherein the instructions further cause the machine to cause an availability advertisement to be transmitted, the availability advertisement indicating available storage space in the memory.

13. The storage medium of claim 11, wherein the instructions further cause the machine to authenticate the vehicle based on information in the session establishment request.

14. The storage medium of claim 11, wherein the instructions further cause the machine to advertise services to the vehicle based on a service discovery request from the vehicle.

15. The storage medium of claim 11, wherein the instructions further cause the machine to:
   process a data upload request from an entity, the data upload request requesting the data based on the storage record information;
   cause the data to be transmitted to the entity for consumption based on the data upload request; and
   delete the data from the memory after the data has been transmitted to the entity.

16. A method, comprising:
   receiving, at a road side unit (RSU), a session establishment request from a vehicle in the vicinity of the RSU;

establishing a data offload session between the vehicle and the RSU based on the session establishment request;

receiving data from the vehicle during the data offload session, the data comprising sensor data for one or more sensors coupled to the vehicle;

storing the data in a memory coupled to the RSU;

generating storage record information for the stored data, the storage record information comprising information identifying the RSU; and transmitting the storage record information from the RSU to the vehicle.

17. The method of claim 16, wherein session establishment request is based on an availability advertisement received by the vehicle indicating available storage space in the memory.

18. The method of claim 17, wherein the availability advertisement is transmitted by the RSU.

19. The method of claim 17, wherein the RSU is a first RSU and the availability advertisement is transmitted by a second RSU communicably coupled to the first RSU.

20. The method of claim 16, further comprising:

receiving, at the RSU, a data upload request from an entity, the data upload request requesting the data based on the storage record information; and transmitting the data to the entity for consumption in response to the data upload request.

* * * * *